(12) United States Patent
Crance

(10) Patent No.: US 7,774,857 B2
(45) Date of Patent: *Aug. 10, 2010

(54) METHOD AND SYSTEM FOR PROTECTION OF ELECTRONIC DIGITAL CONTENT

(75) Inventor: Gary Crance, Plano, TX (US)

(73) Assignee: AOL Inc., Dulles, VA (US)

(*) Notice: Subject to any disclaimer, the term of this patent is extended or adjusted under 35 U.S.C. 154(b) by 297 days.

This patent is subject to a terminal disclaimer.

(21) Appl. No.: 11/949,148

(22) Filed: Dec. 3, 2007

(65) Prior Publication Data

US 2008/0163384 A1    Jul. 3, 2008

Related U.S. Application Data

(63) Continuation of application No. 09/688,142, filed on Oct. 16, 2000, now Pat. No. 7,305,713.

(60) Provisional application No. 60/159,370, filed on Oct. 14, 1999.

(51) Int. Cl.
*G06F 3/00* (2006.01)

(52) U.S. Cl. ............................. 726/33; 726/26; 726/32; 705/57; 715/741

(58) Field of Classification Search ................. 715/741, 715/743
See application file for complete search history.

(56) References Cited

U.S. PATENT DOCUMENTS

| 5,881,287 | A  | 3/1999 | Mast |
| 5,905,505 | A  | 5/1999 | Lesk |
| 6,032,150 | A  | 2/2000 | Nguyen |
| 6,209,103 | B1 | 3/2001 | Schreiber et al. |
| 6,587,843 | B1 | 7/2003 | Gelfer et al. |
| 6,731,756 | B1 | 5/2004 | Pizano et al. |

OTHER PUBLICATIONS http://www.artistscope.net/news/1999-06-30.htm, The door is finally closed on image capture, Jun. 1999, p. 1.
http://www.artistscope.net/news/1999-01-30.htm, Artistscope releases new image protection for the Internet, Feb. 1999, p. 1.
http://www.artistscope.net/news/1998-01-01.htm, "The first expedition", Jan. 1998, p. 1.
Lemay et al., Teach Yourself JAVA 2 in 21 days, SAMS Publishing, pp. 175-200, 233-291, 319-380, Dec. 1998.
Huseby, Sverre H., "Video on the World Wide Web Accessing Video from WWW Browsers," Feb. 2, 1997, pp. 1-5.

*Primary Examiner*—Jung Kim
(74) *Attorney, Agent, or Firm*—Finnegan, Henderson, Farabow, Garrett & Dunner, LLP

(57) ABSTRACT

A computer-implemented method of protecting content includes receiving a request from a user to access the content. The user is enabled to perceive the content based on the request received from the user. The user is prevented from capturing the content when perception of the content is enabled. The method may be performed by a Java applet running in a network environment.

20 Claims, 16 Drawing Sheets

METHOD AND SYSTEM FOR PROTECTION OF ELECTRONIC DIGITAL CONTENT

CROSS REFERENCE TO RELATED APPLICATIONS

This application is a continuation of U.S. application Ser. No. 09/688,142, filed Oct. 16, 2000, and titled "Method and System for Preventing Capture of Electronic Digital Content," which issued as U.S. Pat. No. 7,305,713 on Dec. 4, 2007, which claimed priority under 35 USC §119(e)(1) to U.S. Application 60/159,370, filed Oct. 14, 1999. The entire contents of both of these applications are hereby incorporated by reference.

TECHNICAL FIELD

This application relates to protecting against unauthorized capturing of electronic content.

BACKGROUND

Subscribers to online services have virtually on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from repositories located throughout the world. Subscribers may perceive online content in a variety of ways. For example, a subscriber may read a document, view an image, or listen to a song while online.

SUMMARY

The systems and techniques described here provide a simple yet effective mechanism for allowing users to access electronic content while at the same time preventing users from copying or otherwise capturing the electronic content. As a result, content providers have an increased ability to control the usage and distribution of their electronic content. The systems and techniques are particularly useful with respect to digital images.

In one general aspect, a computer-implemented method of protecting content includes receiving a request from a user to access the content. Based on the request received from the user, the user is allowed to perceive the content but is prevented from capturing the content.

Implementations may include one or more of the following features. For example, an indicator may be presented to indicate the presence of the content, with the indicator differing from the content. In one implementation, the content may be an image and the indicator may include a display area that is substantially the same size as the image and is substantially at the same location as the image. The indicator may include text that directs the user to press and hold an input device when a graphical interface tool is positioned over the indicator in order to perceive the content.

Allowing the user to perceive the content may include presenting the content to the user when the user activates an input device after positioning the graphical interface tool over the indicator. The user may be prevented from capturing the content by limiting activities of the user while the input device is being used to perceive the content. For instance, activation of another device may be prevented while the input device is being used to perceive the content. The functionality of the input device itself also may be limited to prevent the input device from being used to capture content that the input device is being used to access and/or perceive.

The content may be presented in a browser window to allow perception of content by the user. In this manner, the user may be prevented from capturing the content by preventing the user from accessing a browser application that otherwise enables copying and saving of the content.

Preventing the user from capturing the content may also include preventing a perception of the content whenever the user attempts to capture the content.

An icon that differs from the content and that indicates a presence of the content may be presented. The content may include an image and preventing the user from capturing the content may include preventing the user from copying or saving the image. Presenting the icon may include displaying the icon in an area that has a size and a location that are substantially the same as a size and a location of the image. Presenting the icon may also include directing the user to operate an input device in a prescribed manner to request access to the content when a graphical interface tool is positioned over the icon.

Receiving a request from the user to access the content may include receiving input from a user corresponding to the positioning of a graphical interface tool over the icon. Preventing the user from capturing the content may include preventing the user from using a single device to both present and capture the content.

Preventing the user from capturing the content may include preventing perception of the content whenever the user attempts to capture the content.

The method may be performed by a Java applet. The content may reside at a webpage, and the content may be described in hyper-text markup language (HTML). The request received from the user to access the content may include instructions from the user to access a document, with the instructions including a network address of the document.

The user may be enabled to perceive the content by displaying an image or otherwise making content perceivable. For instance, the content may include sound and the user may perceive the content by playing the sound, the content may include text and the user may perceive the content by displaying the text, or the content may include video and the user may perceive the content by playing the video.

The features may be embodied in a method as described above, may be embodied in a computer program, or they may be performed by one or more physical elements, structures and/or systems.

The details of one or more implementations are set forth in the accompanying drawings and the description provided below. Other features and advantages will be apparent from the description, the drawings, and the claims.

DRAWING DESCRIPTIONS

Like reference numbers and designations in the various drawings indicate like elements.

DETAILED DESCRIPTION

Network users view and increasingly copy digital images, also referred to as electronic images and other electronic content that appear on webpages, even when not authorized to do so. Such images may be the property of content providers who intend to provide visual access to their webpages and the images in these webpages, but who may not intend to enable copying of the webpages or images by unauthorized users. The present inventor recognized that it would be advantageous to provide content providers with a mechanism for preventing users from copying online digital images while still allowing users to view the images. To this end, the following discussion is directed to preventing unauthorized capturing of an online digital image, or any other electronic content that may be perceived by a user.

Figure 1:
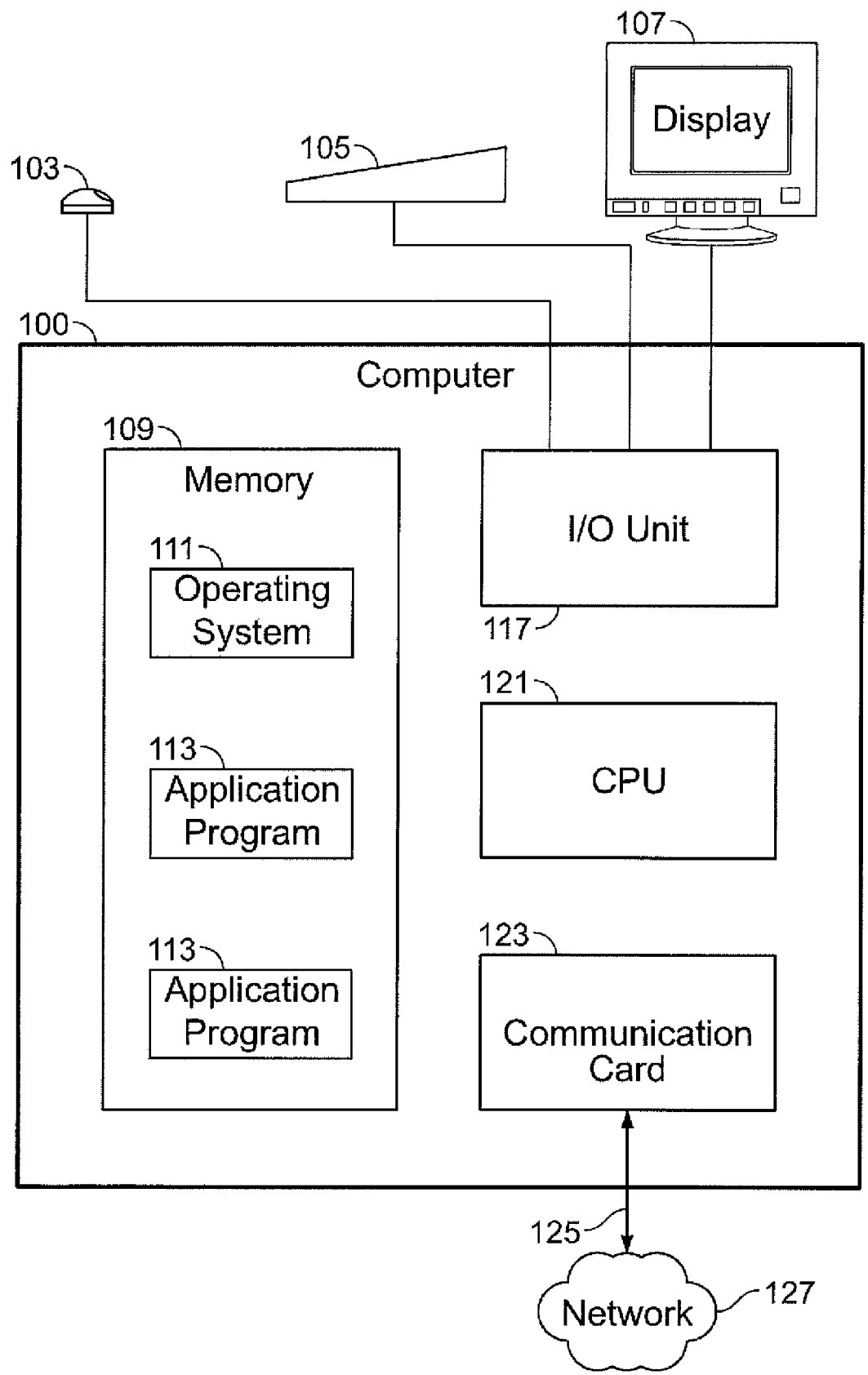
FIG. 1 is a block diagram of a computer system.

The computer system 100 illustrated in FIG. 1 represents a hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The computer system 100 of FIG. 1 may also be programmed with computer-readable instructions to enable content to be perceived (for example, viewed) without being captured (for example, copied, saved, or printed).

The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 preferably also includes some sort of communications card or device 123 (for example, a modem or network adapter) for exchanging data with a network 127 via a communications link 125 (for example, a telephone line).

Figure 2:
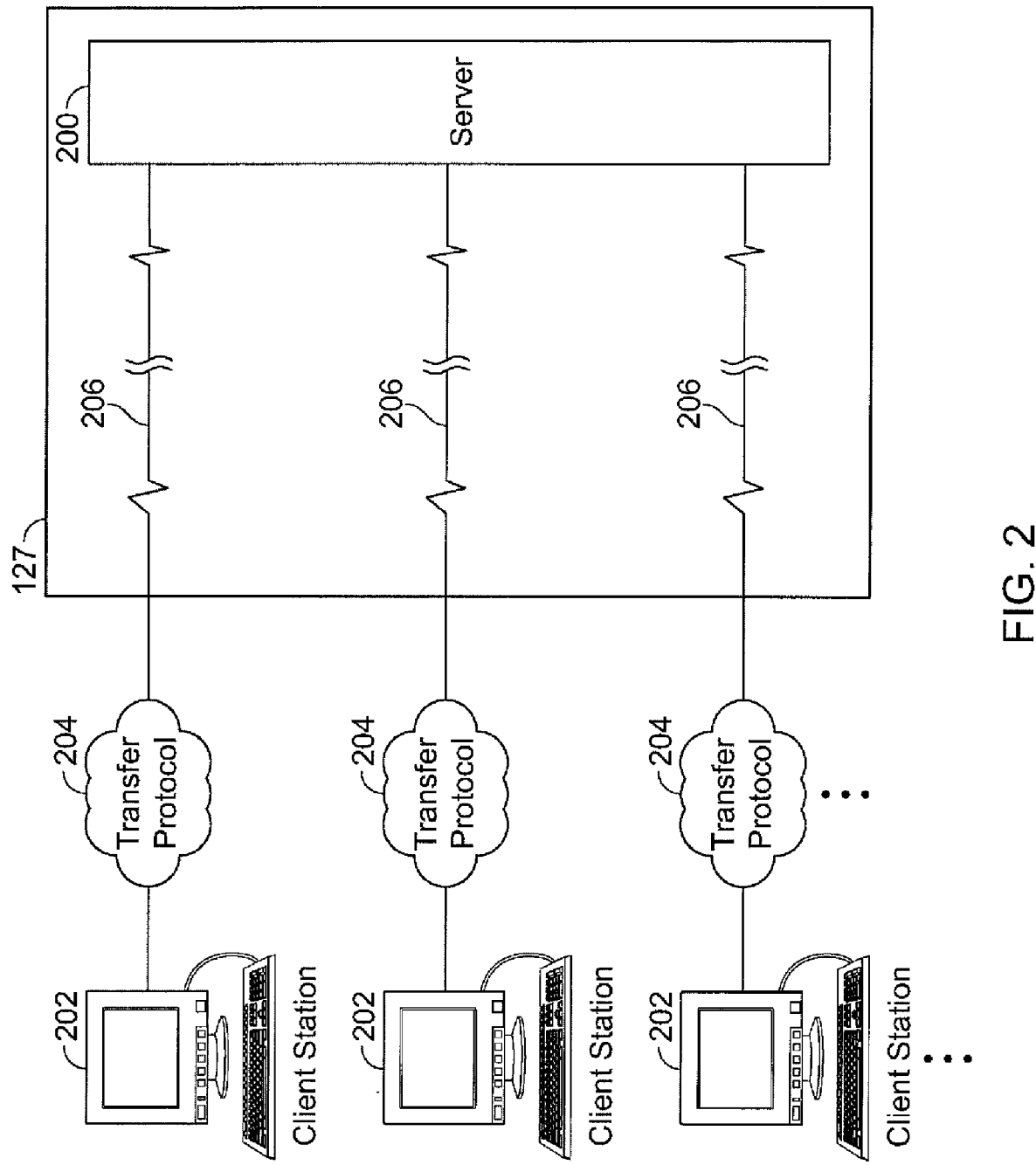
FIG. 2 shows a typical graphical user interface (GUI) environment.

As shown in FIG. 2, using network 127, a user of a computer system can access electronic content or other resources either stored locally at the user's own client system 202 (for example, a personal or laptop computer), remotely at one or more server systems 200, or at other client systems 202. An example of a server system 200 is a host computer that provides subscribers with online computer data and services such as e-mail, e-commerce, chat rooms, Internet access, electronic newspapers and magazines, etc.

Users of a host computer's online services typically communicate with one or more central server systems 200 through client software executing on their respective client systems 202. In practice, a server system 200 typically will not be a single monolithic entity but rather will be a network of interconnected server computers, possibly physically dispersed from each other, each dedicated to its own set of duties and/or to a particular geographical region. In such a case, the server computers are interconnected by a network of communication links.

Each client system 202 runs client software that enables communication with corresponding software running on the server system 200. The client systems 202 communicate with the server system 200 through various channels 204 and lines 206, such as a modem connected to a telephone line, a direct Internet connection using a transfer protocol such as TCP/IP (Transfer Control Protocol/Internet Protocol), cable, integrated services digital network (ISDN), or other transfer protocols. The server system 200 is responsible for receiving input from the client systems 202, manipulating the collective body of input information (and possibly information from other sources) into a useful format, and retransmitting the formatted information back to one or more clients 202 for output on an output device, such as a display screen.

A "browser" is an example of client software that enables users to access and view electronic content stored either locally or remotely, such as in a network environment of interconnected computer systems (for example, local area network (LAN), wide area network (WAN), intranet, Internet). A browser typically is used for displaying documents described in Hyper-Text Markup Language (HTML) and stored on servers connected to a network such as the Internet. A user instructs a browser to access an electronic document ("webpage") by specifying a network address—or Uniform Resource Locator (URL)—indicating the location of a desired webpage. In response, the browser contacts the corresponding server 200 hosting the requested webpage, retrieves the one or more files that make up the webpage, and then displays the webpage in a window on the user's computer screen.

Figure 3:
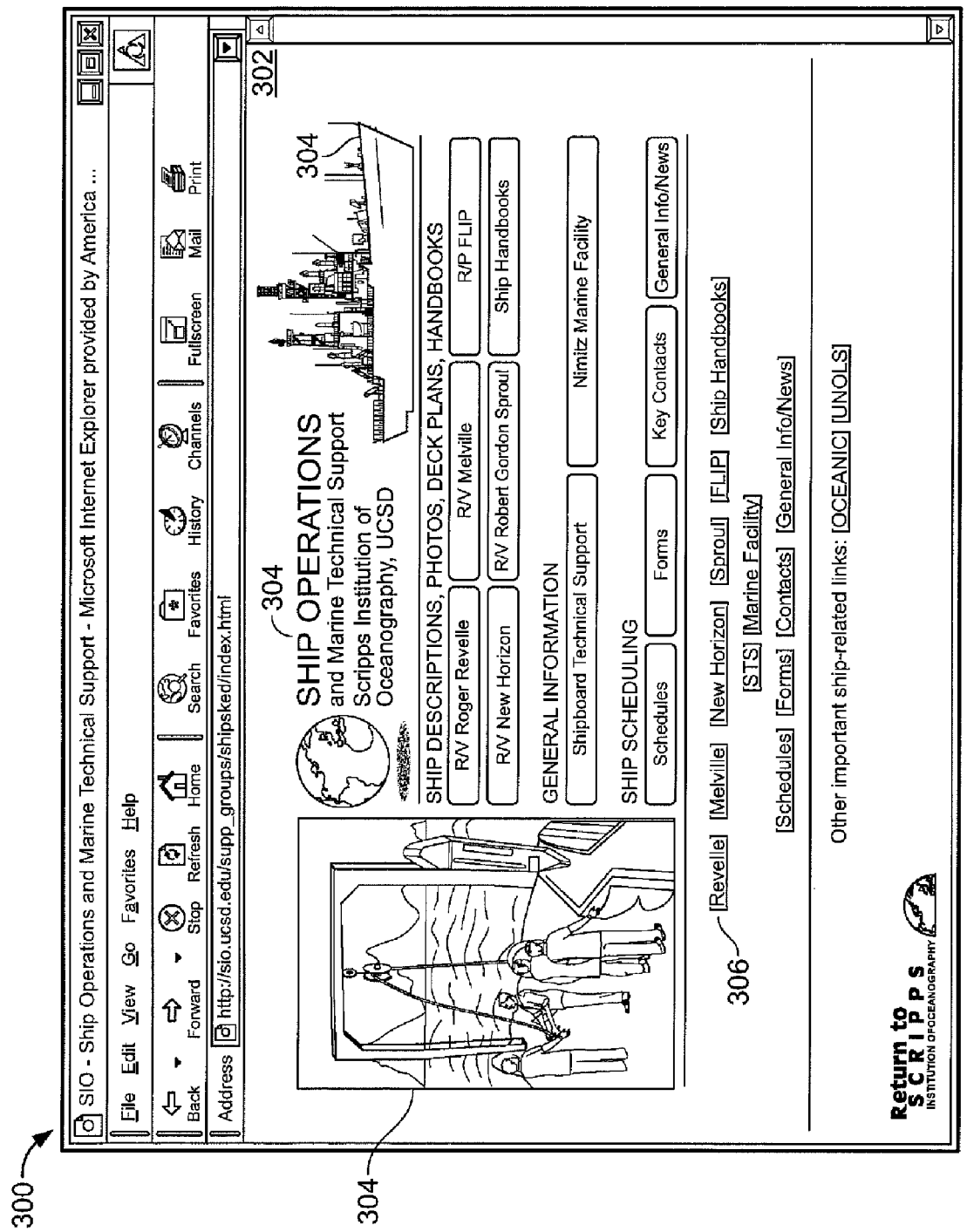
FIG. 3 is a screenshot of a browser application window.

FIG. 3 is a screenshot of a browser application 300 (Microsoft Internet Explorer) displaying a typical webpage 302. As shown therein, a single webpage 302 may be composed of several different files potentially of different data types 304 (for example, text, graphics, images, virtual worlds, sounds, and movies). In addition, a webpage 302 can include links 306 pointing to other resources (for example, other webpages or individual files) available at the server system 200 or through the network 127. Links 306 can take virtually any visual form, for example, they can appear either as a text string or as a graphical image or a combination thereof. Each link 306 has an associated URL pointing to a location on the network 127. When a user selects a displayed link 306, the browser automatically will retrieve the webpage (or other resource) corresponding to the URL associated with the link and will display and execute the electronic information at the retrieved webpage or resource.

Figure 4:
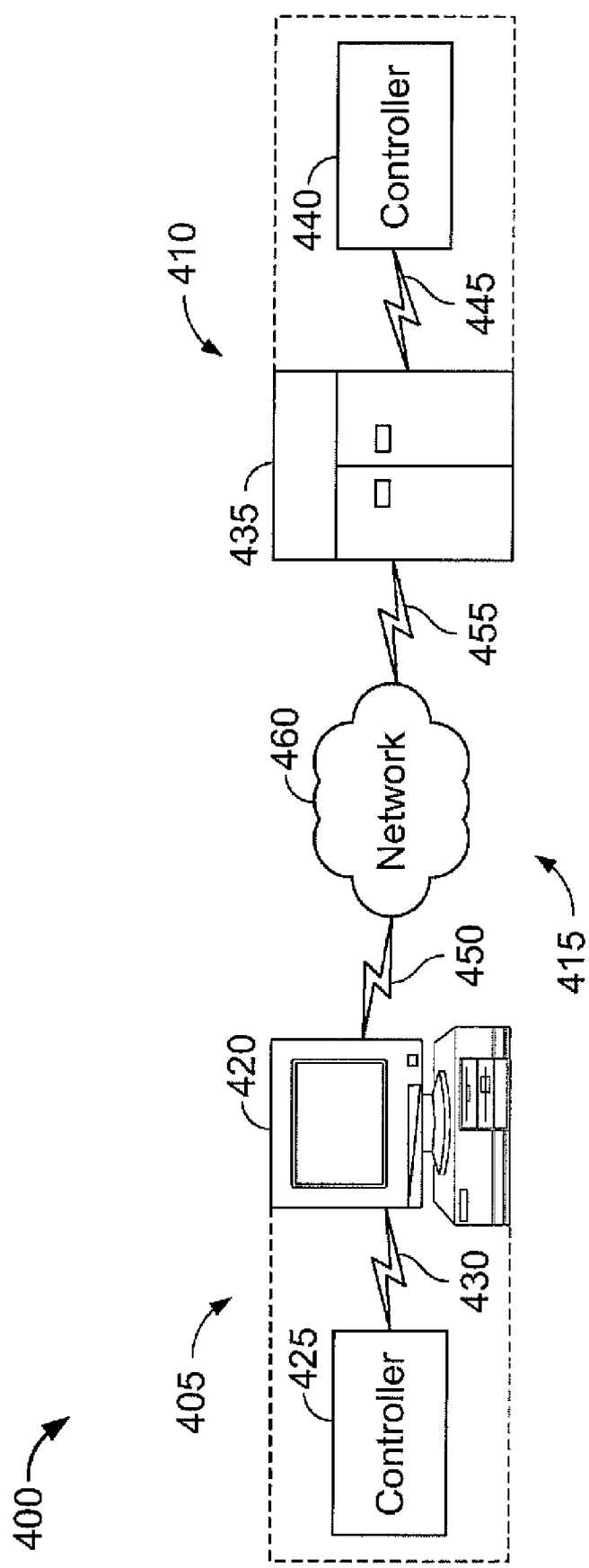
FIG. 4 is a block diagram of a communications system.

For illustrative purposes, FIGS. 4-9 describe a communications system for implementing techniques for transferring files between subscribers of a host complex. Referring to FIG. 4, a communications system 400 is capable of delivering and exchanging data between a client system 405 and a host system 410 through a communications link 415. The client system 405 typically includes one or more client devices 420 and/or client controllers 425. For example, the client system 405 may include one or more general-purpose computers (for example, personal computers), one or more special-purpose computers (for example, devices specifically programmed to communicate with each other and/or the host system 410), or a combination of one or more general-purpose computers and one or more special-purpose computers. The client system 405 may be arranged to operate within or in concert with one or more other systems, such as for example, one or more Local Area Networks (LANs) and/or one or more Wide Area Networks (WANs).

The client device 420 is generally capable of executing instructions under the command of a client controller 425. The client device 420 is connected to the client controller 425 by a wired or wireless data pathway 430 capable of delivering data.

The client device 420 and client controller 425 each typically includes one or more hardware components and/or software components. An example of a client device 420 is a general-purpose computer (for example, a personal computer) capable of responding to and executing instructions in a defined manner. Other examples include a special-purpose computer, a workstation, a server, a device, a component, other physical or virtual equipment or some combination thereof capable of responding to and executing instructions. An example of client controller 425 is a software application loaded on the client device 420 for commanding and directing communications enabled by the client device 420. Other examples include a program, a piece of code, an instruction, a device, a computer, a computer system, or a combination thereof, for independently or collectively instructing the client device 420 to interact and operate as described herein. The client controller 425 may be embodied permanently or temporarily in any type of machine, component, physical or virtual equipment, storage medium, or propagated signal capable of providing instructions to the client device 420.

The communications link 415 typically includes a delivery network 460 making a direct or indirect communication between the client system 405 and the host system 410, irrespective of physical separation. Examples of a delivery network 460 include the Internet, the World Wide Web, WANs, LANs, analog or digital wired and wireless telephone networks (for example, PSTN, ISDN, and xDSL), radio, television, cable, satellite, and/or any other delivery mechanism for carrying data. The communications link 415 may include communication pathways 450, 455 that enable communications through the one or more delivery networks 460 described above. Each of the communication pathways 450, 455 may include, for example, a wired, wireless, cable or satellite communication pathway.

The host system 410 includes a host device 435 capable of executing instructions under the command and direction of a host controller 440. The host device 435 is connected to the host controller 440 by a wired or wireless data pathway 445 capable of carrying and delivering data.

The host system 410 typically includes one or more host devices 435 and/or host controllers 440. For example, the host system 410 may include one or more general-purpose computers (for example, personal computers), one or more special-purpose computers (for example, devices specifically programmed to communicate with each other and/or the client system 405), or a combination of one or more general-purpose computers and one or more special-purpose computers. The host system 410 may be arranged to operate within or in concert with one or more other systems, such as, for example, one or more LANs and/or one or more WANs.

The host device 435 and host controller 440 each typically includes one or more hardware components and/or software components. An example of a host device 435 is a general-purpose computer (for example, a personal computer) capable of responding to and executing instructions in a defined manner. Other examples include a special-purpose computer, a workstation, a server, a device, a component, other physical or virtual equipment or some combination thereof capable of responding to and executing instructions. An example of host controller 440 is a software application loaded on the host device 435 for commanding and directing communications enabled by the host device 435. Other examples include a program, a piece of code, an instruction, a device, a computer, a computer system, or a combination thereof, for independently or collectively instructing the host device 435 to interact and operate as described herein. The host controller 440 may be embodied permanently or temporarily in any type of machine, component, physical or virtual equipment, storage medium, or propagated signal capable of providing instructions to the host device 435.

Figure 5:
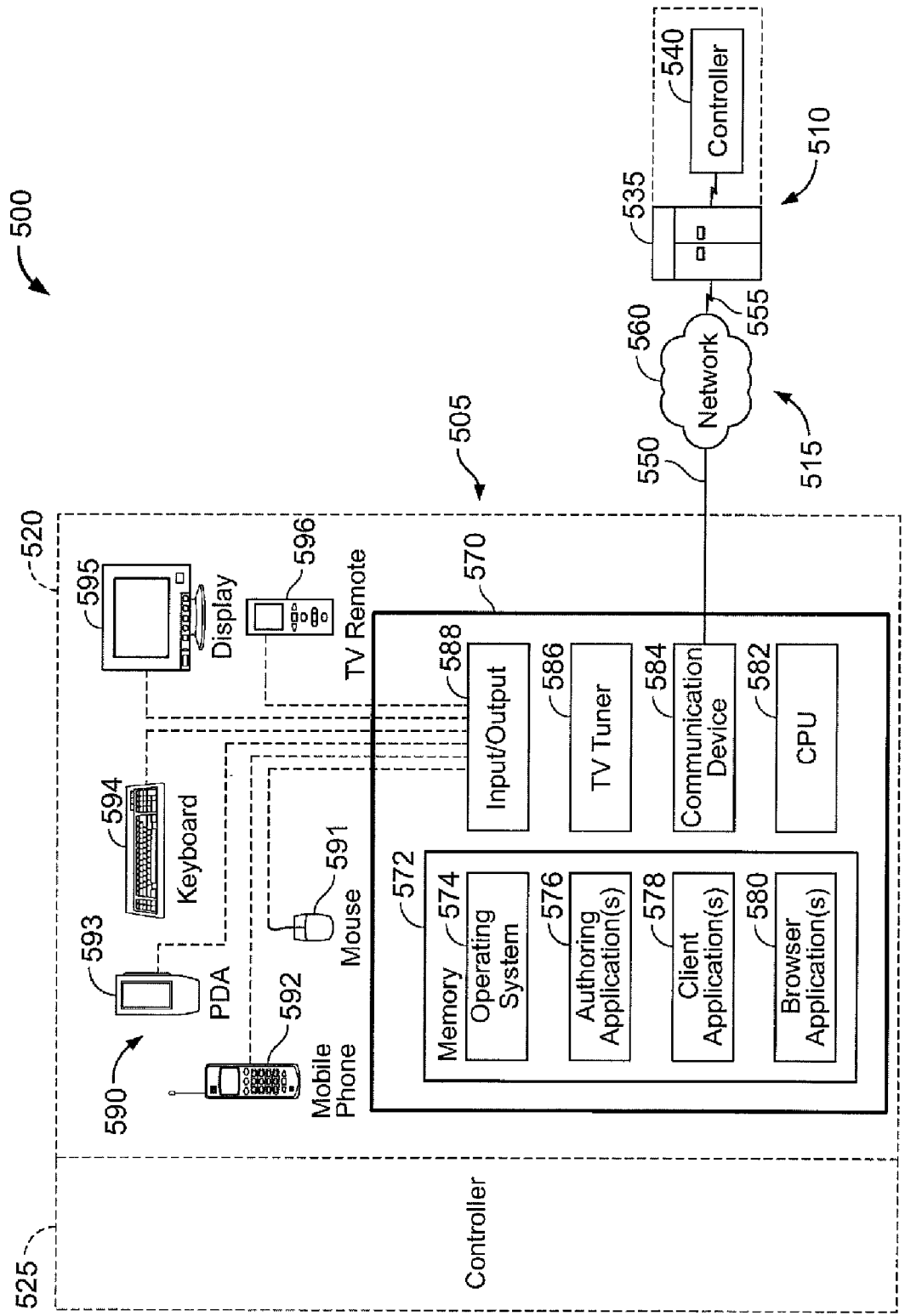
FIGS. 5-9 are expansions of the block diagram of FIG. 4.

FIG. 5 illustrates a communication system 500 including a client system 505 communicating with a host system 510 through a communications link 515. Client system 505 typically includes one or more client devices 520 and one or more client controllers 525 for controlling the client devices 520.

Host system 510 typically includes one or more host devices 535 and one or more host controllers 540 for controlling the host devices 535. The communications link 515 may include communication pathways 550, 555 enabling communications through the one or more delivery networks 560.

Examples of each element within the communication system of FIG. 5 are broadly described above with respect to FIG. 4. In particular, the host system 510 and communications link 515 typically have attributes comparable to those described with respect to host system 410 and communications link 415 of FIG. 4, respectively. Likewise, the client system 505 of FIG. 5 typically has attributes comparable to and may illustrate one possible embodiment of the client system 405 of FIG. 4.

The client device 520 typically includes a general purpose computer 570 having an internal or external storage 572 for storing data and programs such as an operating system 574 (for example, DOS, Windows™, Windows 95™, Windows 98™, Windows 2000™, Windows NT™, OS/2, and Linux) and one or more application programs. Examples of application programs include authoring applications 576 (for example, word processing, database programs, spreadsheet programs, and graphics programs) capable of generating documents or other electronic content; client applications 578 (for example, AOL client, CompuServe client, AIM client, AOL TV client, and ISP client) capable of communicating with other computer users, accessing various computer resources, and viewing, creating, or otherwise manipulating electronic content; and browser applications 580 (for example, Netscape's Navigator and Microsoft's Internet Explorer) capable of rendering standard Internet content.

The general-purpose computer 570 also includes a central processing unit (CPU) 582 for executing instructions in response to commands from the client controller 525. In one implementation, the client controller 525 includes one or more of the application programs installed on the internal or external storage 572 of the general-purpose computer 570. In another implementation, the client controller 525 includes application programs externally stored in and performed by one or more device(s) external to the general-purpose computer 570.

The general-purpose computer typically will include a communication device 584 for sending and receiving data. One example of the communication device 584 is a modem. Other examples include a transceiver, a set-top box, a communication card, a satellite dish, an antenna, or another network adapter capable of transmitting and receiving data over the communications link 515 through a wired or wireless data pathway 550. The general-purpose computer 570 also may include a television (TV) tuner 586 for receiving television programming in the form of broadcast, satellite, and/or cable TV signals. As a result, the client device 520 can selectively and/or simultaneously display network content received by communications device 584 and television programming content received by the TV tuner 586.

The general-purpose computer 570 typically will include an input/output interface 588 to enable a wired or wireless connection to various peripheral devices 590. Examples of peripheral devices 590 include, but are not limited to, a mouse 591, a mobile phone 592, a personal digital assistant (PDA) 593, a keyboard 594, a display monitor 595 with or without a touch screen input, and/or a TV remote control 596 for receiving information from and rendering information to subscribers. Other examples may include voice recognition and synthesis devices.

Although FIG. 5 illustrates devices such as a mobile telephone 592, a PDA 593, and a TV remote control 596 as being peripheral with respect to the general-purpose computer 570, in another implementation, such devices may themselves include the functionality of the general-purpose computer 570 and operate as the client device 520. For example, the mobile phone 592 or the PDA 593 may include computing and networking capabilities and function as a client device 520 by accessing the delivery network 560 and communicating with the host system 510. Furthermore, the client system 505 may include one, some or all of the components and devices described above.

Figure 6:
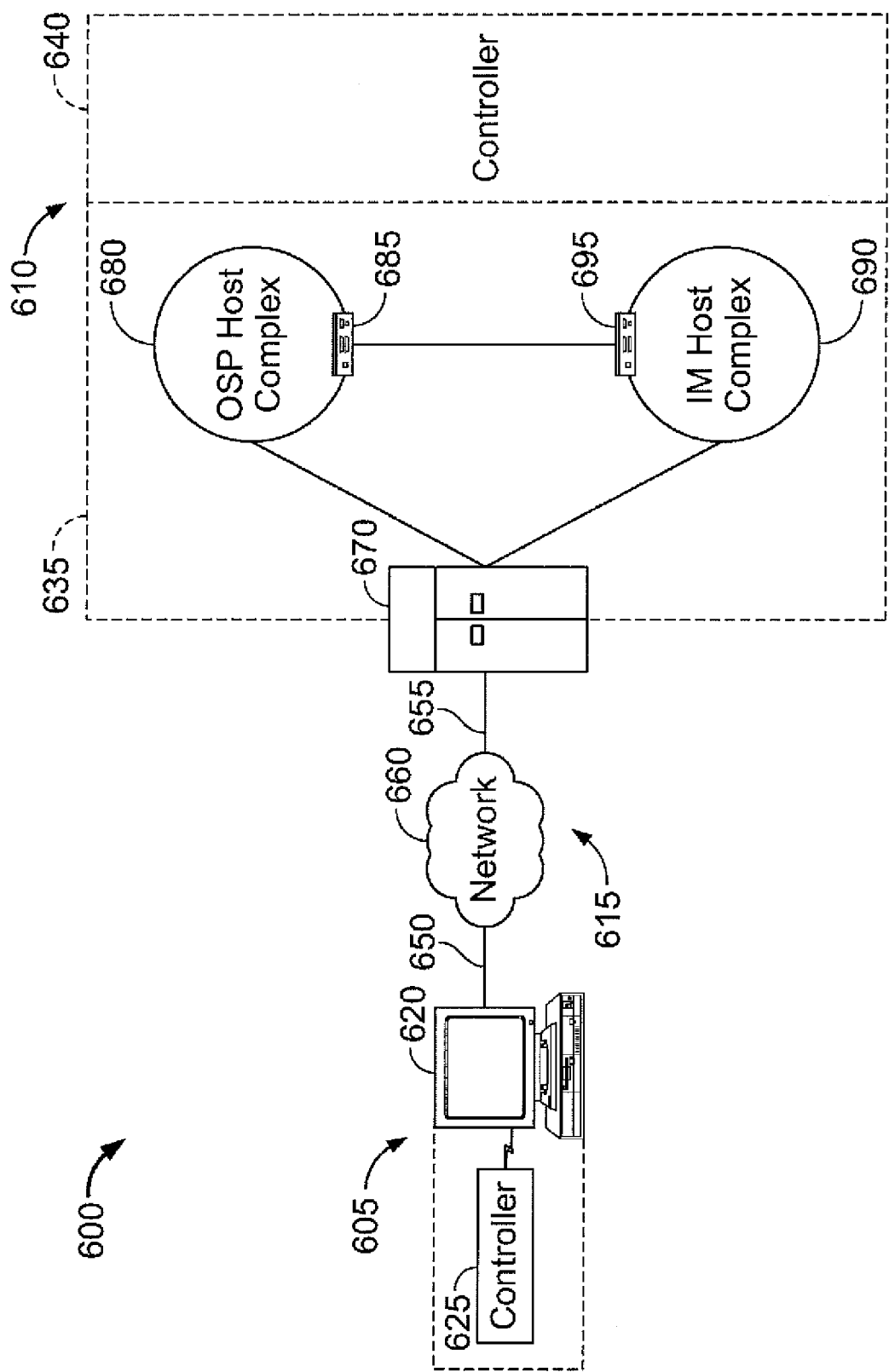

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 4 and 5. In particular, the client system 605 and the communications link 615 typically have attributes comparable to those described with respect to client systems 405 and 505 and communications links 415 and 515 of FIGS. 4 and 5, respectively. Likewise, the host system 610 of FIG. 6 may have attributes comparable to and may illustrate one possible embodiment of the host systems 410 and 510 shown in FIGS. 4 and 5, respectively.

The host system 610 includes a host device 635 and a host controller 640. The host controller 640 is generally capable of transmitting instructions to any or all of the elements of the host device 635. For example, in one implementation, the host controller 640 includes one or more software applications loaded on the host device 635. However, in other implementations, as described above, the host controller 640 may include any of several other programs, machines, and devices operating independently or collectively to control the host device 635.

The host device 635 includes a login server 670 for enabling access by subscribers and routing communications between the client system 605 and other elements of the host device 635. The host device 635 also includes various host complexes such as the depicted Online Service Provider (OSP) host complex 680 and Instant Messaging (IM) host complex 690. To enable access to these host complexes by subscribers, the client system 605 may include communication software, for example, an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers (buddies) are online, exchange instant messages with particular subscribers, participate in group chat rooms, trade files such as pictures, invitations or documents, find other subscribers with similar interests, get customized news and stock quotes, and search the Web.

Typically, the OSP host complex 680 supports different services, such as email, discussion groups, chat, news services, and Internet access. The OSP host complex 680 is generally designed with an architecture that enables the machines within the OSP host complex 680 to communicate with each other, certain protocols (that is, standards, formats, conventions, rules, and structures) being employed to enable the transfer of data. The OSP host complex 680 ordinarily employs one or more OSP protocols and custom dialing engines to enable access by selected client applications. The OSP host complex 680 may define one or more specific protocols for each service based on a common, underlying proprietary protocol.

The IM host complex 690 is generally independent of the OSP host complex 680, and supports instant messaging services regardless of a subscriber's network or Internet access. Thus, the IM host complex 690 allows subscribers to send and receive instant messages, whether or not they have access to any particular ISP. The IM host complex 690 may support associated services, such as administrative matters, advertising, directory services, chat, and interest groups related to the instant messaging. The IM host complex 690 has an architecture that enables all of the machines within the IM host complex to communicate with each other. To transfer data, the IM host complex 690 employs one or more standard or exclusive IM protocols.

The host device 635 may include one or more gateways that connect and therefore link complexes, such as the OSP host complex gateway 685 and the IM host complex gateway 695. The OSP host complex gateway 685 and the IM host complex 695 gateway may directly or indirectly link the OSP host complex 680 with the IM host complex 690 through a wired or wireless pathway. Ordinarily, when used to facilitate a link between complexes, the OSP host complex gateway 685 and the IM host complex gateway 695 are privy to information regarding a protocol anticipated by a destination complex, which enables any necessary protocol conversion to be performed incident to the transfer of data from one complex to another. For instance, the OSP host complex 680 and IM host complex 690 may use different protocols such that transferring data between the complexes requires protocol conversion by or at the request of the OSP host complex gateway 685 and/or the IM host complex gateway 695.

Figure 7:
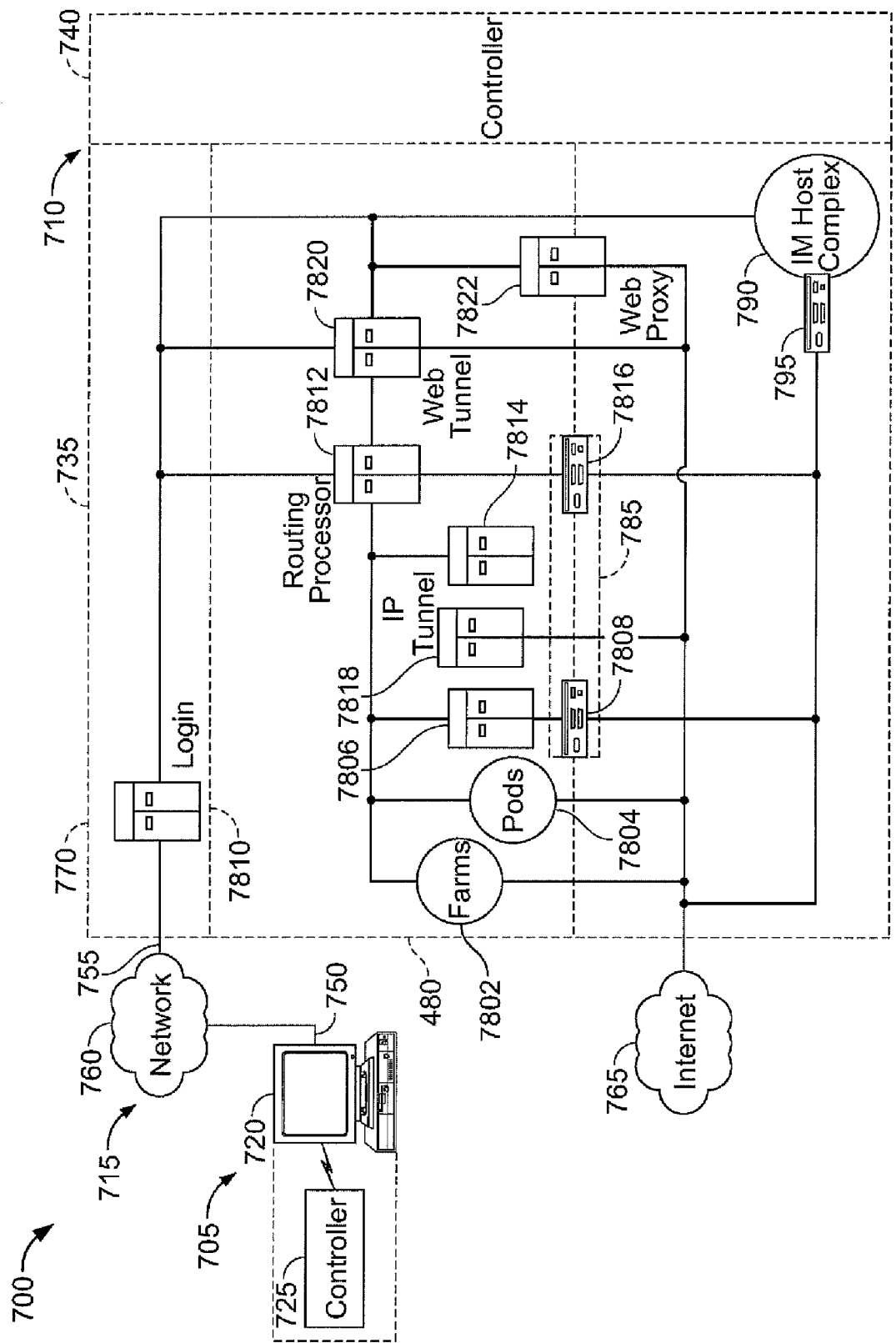

Referring to FIG. 7, a communications system 700 is capable of delivering and exchanging information between a client system 705 and a host system 710 through a communication link 715. Client system 705 typically includes one or more client devices 720 and one or more client controllers 725 for controlling the client devices 720. Host system 710 typically includes one or more host devices 735 and one or more host controllers 740 for controlling the host devices 735. The communications link 715 may include communication pathways 750, 755 enabling communications through the one or more delivery networks 760. As shown, the client system 705 may access the Internet 765 through the host system 710.

Examples of each element within the communication system of FIG. 7 are broadly described above with respect to FIGS. 4-6. In particular, the client system 705 and the communications link 715 typically have attributes comparable to those described with respect to client systems 405, 505, and 605 and communications links 415, 515, and 615 of FIGS. 4-6, respectively. Likewise, the host system 710 of FIG. 7 may have attributes comparable to and may illustrate one possible embodiment of the host systems 410, 510, and 610 shown in FIGS. 4-6, respectively. However, FIG. 7 describes an aspect of the host system 710, focusing primarily on one particular implementation of OSP host complex 780.

The client system 705 includes a client device 720 and a client controller 725. The client controller 725 is generally capable of establishing a connection to the host system 710, including the OSP host complex 780, the IM host complex 790 and/or the Internet 765. In one implementation, the client controller 725 includes an OSP application for communicating with servers in the OSP host complex 780 using OSP protocols that may or may not be exclusive or proprietary. The client controller 725 also may include applications, such as an IM client application and/or an Internet browser application, for communicating with the IM host complex 790 and the Internet 765.

The host system 710 includes a host device 735 and a host controller 740. The host controller 740 is generally capable of transmitting instructions to any or all of the elements of the host device 735. For example, in one implementation, the host controller 740 includes one or more software applications loaded on one or more elements of the host device 735. However, in other implementations, as described above, the host controller 740 may include any of several other programs, machines, and devices operating independently or collectively to control the host device 735.

The host device 735 includes a login server 770 capable of enabling communications between client systems 705 and various elements of the host system 710, including elements such as OSP host complex 780 and IM host complex 790. The login server 770 may implement one or more authorization procedures to enable simultaneous access to one or more of these elements.

The OSP host complex 780 and the IM host complex 790 are typically connected through one or more OSP host complex gateways 785 and one or more IM host complex gateways 795. Each OSP host complex gateway 785 and IM host complex gateway 795 may generally perform protocol conversions necessary to enable communication between one or more of the OSP host complex 780, the IM host complex 790, and the Internet 765.

The OSP host complex 780 supports a set of services to be accessed through and/or performed by from one or more servers located internal to and external from the OSP host complex 780. Servers external to the OSP host complex 780 may communicate using the Internet 765. Servers internal to the OSP complex 780 may be arranged in one or more configurations. For example, servers may be arranged in large centralized clusters identified as farms 7802 or in localized clusters identified as pods 7804.

More specifically, farms 7802 are groups of servers located at centralized locations within the OSP host complex 780. Farms 7802 generally are dedicated to providing particular functionality and services to subscribers and clients from a centralized location, regardless of the location of the subscriber or client. Farms 7802 are particularly useful for providing services that depend upon other remotely-located or performed processes and services for information, such as, for example, chat, email, instant messaging, news, newsgroups, search, stock updates, and weather. Thus, farms 7802 tend to rely on connections with external resources such as the Internet 765 and/or other servers within the OSP host complex 780.

By contrast to farms 7802, pods 7804 are clusters of localized servers that provide some services offered by the OSP host complex 780 from a location local to the service or information recipient, thus reducing and avoiding time delays and congestion inherent in centralized processing. Each pod 7804 includes one or more interrelated servers capable of operating together to provide one or more services offered by the OSP host complex 780 in a geographically localized manner, the servers within a pod 7804 generally operating independently rather than relying on resources external to the pod 7804 to operate. A pod 7804 may cache content received from external sources, such as farms 7802 or the Internet 765, making frequently requested information readily available to the local service or information recipients served by the pod 7804. In this way, pods 7804 are particularly useful in providing services that are independent of other processes and servers such as, for example, routing to other localized resources or recipients, providing access to keywords and geographically specific content, providing access to routinely accessed information, and downloading certain software and graphical interface updates with reduced processing time and congestion. The determination of which servers and processes are located in the pod 7804 is made by the OSP according to load distribution, frequency of requests, demographics, and other factors.

In addition to farms 7802 and pods 7804, the implementation of FIG. 7 also includes one or more non-podded and non-farmed servers 7806. In general, the servers 7806 may be dedicated to performing a particular service or information that relies on other processes and services for information and may be directly or indirectly connected to resources outside of the OSP host complex 780, such as the Internet 765 and the IM host complex 790, through an OSP gateway 7808 within OSP host complex gateway 785. In the event that subscriber usage of a particular service or information of the servers 7806 becomes relatively high, those servers 7806 may be integrated into a farm or pod as appropriate.

In the implementation of FIG. 7, one particular exemplary pod 7810 is shown in more detail. Pod 7810 includes a routing processor 7812. In a packet-based implementation, the client system 705 may generate information requests, convert the requests into data packets, sequence the data packets, perform error checking and other packet-switching techniques, and transmit the data packets to the routing processor 7812. Upon receiving data packets from the client system 705, the routing processor 7812 may directly or indirectly route the data packets to a specified destination within or outside of the OSP host complex 780. In general, the routing processor 7812 will examine an address field of a data request, use a mapping table to determine the appropriate destination for the data request, and direct the data request to the appropriate destination.

For example, in the event that a data request from the client system 705 can be satisfied locally, the routing processor 7812 may direct the data request to a local server 7814 in the pod 7810. In the event that the data request cannot be satisfied locally, the routing processor 7812 may direct the data request internally to one or more farms 7802, one or more other pods 7804, or one or more non-podded servers 7806 in the OSP host complex 780, or the routing processor 7812 may direct the data request externally to elements such as the IM host complex 790 through an OSP/pod gateway 7816.

The routing processor 7812 also may direct data requests and/or otherwise facilitate communication between the client system 705 and the Internet 765 through the OSP/pod gateway 7816. In one implementation, the client system 705 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 7812 in the OSP host complex 780. The routing processor 7812 recognizes the Internet 765 as the destination and routes the data packets to an Internet Protocol (IP) tunnel 7818. The IP tunnel 7818 converts the data from the OSP protocol back into standard Internet protocol and transmits the data to the Internet 765. The IP tunnel 7818 also converts the data received from the Internet in the standard Internet protocol back into the OSP protocol and sends the data to the routing processor 7812 for delivery back to the client system 705. At the client system 705, the OSP client application converts the data in the OSP protocol back into standard Internet content for communication with the browser application.

The IP tunnel 7818 may act as a buffer between the client system 705 and the Internet 765, and may implement content filtering and time saving techniques. For example, the IP tunnel 7818 can check parental controls settings of the client system 705 and request and transmit content from the Internet 765 according to the parental control settings. In addition, the IP tunnel 7818 may include a number a caches for storing frequently accessed information. If requested data is determined to be stored in the caches, the IP tunnel 7818 may send the information to the client system 705 from the caches and avoid the need to access the Internet 765.

In another implementation, the client system 705 may use standard Internet protocols and formatting to access pods 7810 and the Internet 765. For example, the subscriber can use an OSP TV client application having an embedded browser application installed on the client system 705 to generate a request in standard Internet protocol, such as HyperText Transport Protocol (HTTP). In a packet-based implementation, data packets may be encapsulated inside a standard Internet tunneling protocol, such as, for example, User Datagram Protocol (UDP), and routed to a web tunnel 7820. The web tunnel 7820 may be a Layer Two Tunneling Protocol (L2TP) tunnel capable of establishing a point-to-point protocol (PPP) session with the client system 705. The web tunnel 7820 provides a gateway to the routing processor 7812 within the pod 7810, the Internet 765, and a web proxy 7822.

The web proxy 7822 can look up subscriber information from the IP address of the client system 705 to determine demographic information such as the subscriber's parental control settings. In this way, the web proxy 7822 can tailor the subscriber's content and user interfaces. The web proxy 7822 can also perform caching functions to store certain Uniform Resource Locators (URLs) and other electronic content so that the web proxy 7822 can locally deliver information to the client system 705 and avoid the need to access the Internet 765 in the event that data requested by the client system 705 has been cached.

Figure 8:
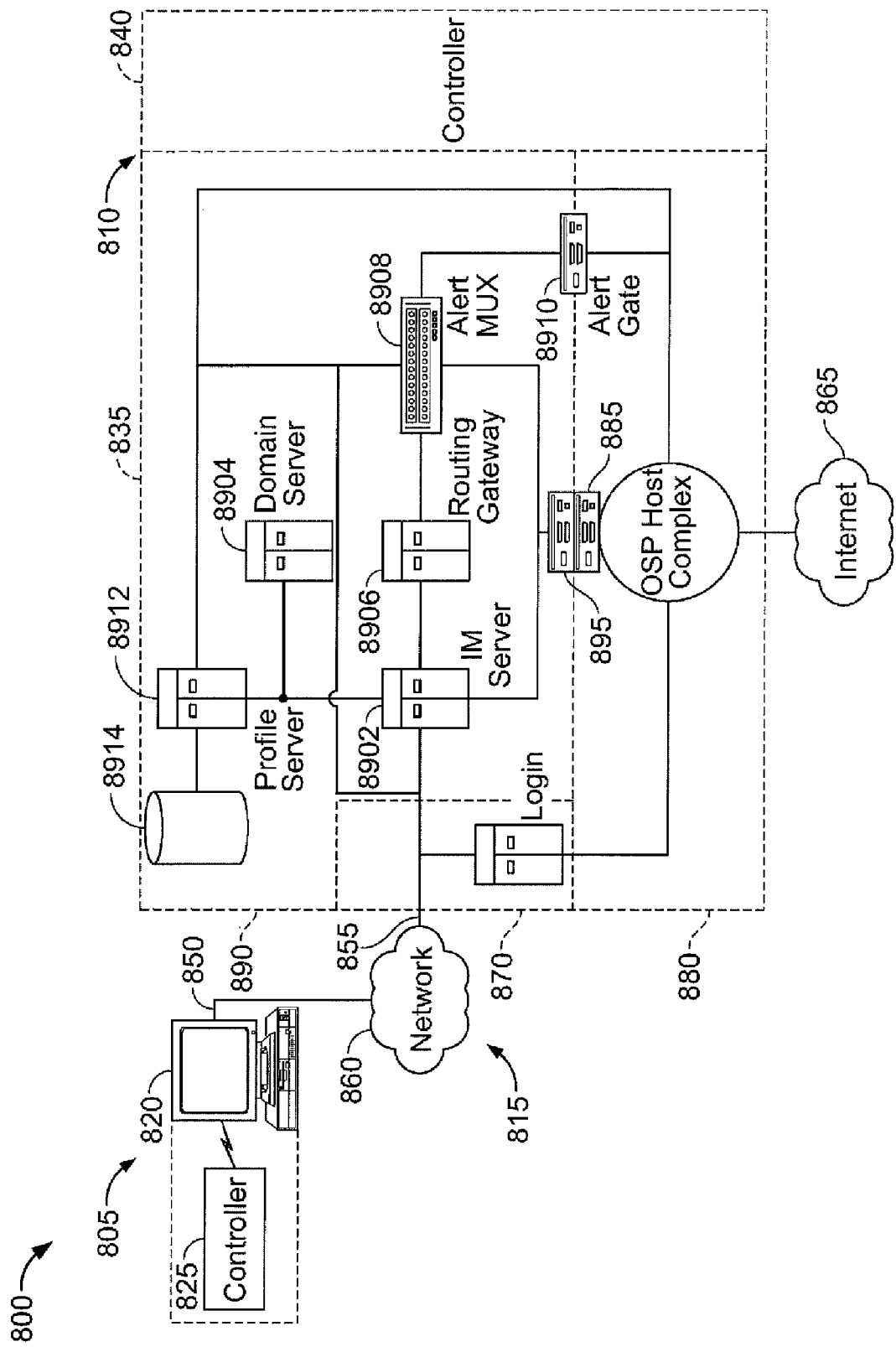

Referring to FIG. 8, a communications system 800 is capable of delivering and exchanging information between a client system 805 and a host system 810 through a communication link 815. Client system 805 typically includes one or more client devices 820 and one or more client controllers 825 for controlling the client devices 820. Host system 810 typically includes one or more host devices 835 and one or more host controllers 840 for controlling the host devices 835. The communications link 815 may include communication pathways 850, 855 enabling communications through the one or more delivery networks 860. As shown, the client system 805 may access the Internet 865 through the host system 810.

Examples of each element within the communication system of FIG. 8 are broadly described above with respect to FIGS. 4-7. In particular, the client system 805 and the communications link 815 typically have attributes comparable to those described with respect to client systems 405, 505, 605, and 705 and communications links 415, 515, 615, and 715 of FIGS. 4-7, respectively. Likewise, the host system 810 of FIG. 8 may have attributes comparable to and may illustrate one possible embodiment of the host systems 410, 510, 610, and 710 shown in FIGS. 4-7, respectively. However, FIG. 8 describes an aspect of the host system 810, focusing primarily on one particular implementation of IM host complex 890.

The client system 805 includes a client device 820 and a client controller 825. The client controller 825 is generally capable of establishing a connection to the host system 810, including the OSP host complex 880, the IM host complex 890 and/or the Internet 865. In one implementation, the client controller 825 includes an IM application for communicating with servers in the IM host complex 890 utilizing exclusive IM protocols. The client controller 825 also may include applications, such as an OSP client application and/or an Internet browser application, for communicating with elements such as the OSP host complex 880 and the Internet 865.

The host system 810 includes a host device 835 and a host controller 840. The host controller 840 is generally capable of transmitting instructions to any or all of the elements of the host device 835. For example, in one implementation, the host controller 840 includes one or more software applications loaded on one or more elements of the host device 835. However, in other implementations, as described above, the host controller 840 may include any of several other programs, machines, and devices operating independently or collectively to control the host device 835.

The host system 810 includes a login server 870 capable of enabling communications between client systems 805 and various elements of the host system 810, including elements such as the OSP host complex 880 and IM host complex 890; login server 870 is also capable of authorizing access by the client system 805 and those elements. The login server 870 may implement one or more authorization procedures to enable simultaneous access to one or more of the elements. The OSP host complex 880 and the IM host complex 890 are connected through one or more host complex gateways 885 and one or more IM host complex gateways 895. Each OSP host complex gateway 885 and IM host complex gateway 895 may perform any protocol conversions necessary to enable communication between the OSP host complex 880, the IM host complex 890, and the Internet 865.

To access the IM host complex 890 to begin an instant messaging session, the client system 805 establishes a connection to the login server 870. The login server 870 typically determines whether the particular subscriber is authorized to access the IM host complex 890 by verifying a subscriber identification and password. If the subscriber is authorized to access the IM host complex 890, the login server 870 employs a hashing technique on the subscriber's screen name to identify a particular IM server 8902 for use during the subscriber's session. The login server 870 provides the client system 805 with the IP address of the particular IM server 8902, gives the client system 805 an encrypted key (that is, a cookie), and breaks the connection. The client system 805 then uses the IP address to establish a connection to the particular IM server 8902 through the communications link 815, and obtains access to that IM server 8902 using the encrypted key. Typically, the client system 805 will be equipped with a Winsock Application Programming Interface (API) that enables the client system 805 to establish an open TCP connection to the IM server 8902.

Once a connection to the IM server 8902 has been established, the client system 805 may directly or indirectly transmit data to and access content from the IM server 8902 and one or more associated domain servers 8904. The IM server 8902 supports the fundamental instant messaging services and the domain servers 8904 may support associated services, such as, for example, administrative matters, directory services, chat and interest groups. The domain servers 8904 can be used to lighten the load placed on the IM server 8902 by assuming responsibility for some of the services within the IM host complex 890. By accessing the IM server 8902 and/or the domain server 8904, a subscriber can use the IM client application to view whether particular subscribers (or buddies) are online, exchange instant messages with particular subscribers, participate in group chat rooms, trade files such as pictures, invitations or documents, find other subscribers with similar interests, get customized news and stock quotes, and search the Web.

In the implementation of FIG. 8, IM server 8902 is directly or indirectly connected to a routing gateway 8906. The routing gateway 8906 facilitates the connection between the IM server 8902 and one or more alert multiplexors 8908. For example, routing gateway 8906 may serve as a link minimization tool or hub to connect several IM servers 8902 to several alert multiplexors 8908. In general, an alert multiplexor 8908 maintains a record of alerts and subscribers registered to receive the alerts.

Once the client system 805 is connected to the alert multiplexor 8908, a subscriber can register for and/or receive one or more types of alerts. The connection pathway between the client system 805 and the alert multiplexor 8908 is determined by employing a hashing technique at the IM server 8902 to identify the particular alert multiplexor 8908 to be used for the subscriber's session. Once the particular multiplexor 8908 has been identified, the IM server 8902 provides the client system 805 with the IP address of the particular alert multiplexor 8908 and gives the client system 805 an encrypted key (that is, a cookie) used to gain access to the identified multiplexor 8908. The client system 805 then uses the IP address to connect to the particular alert multiplexor 8908 through the communication link 815 and obtains access to the alert multiplexor 8908 using the encrypted key.

The alert multiplexor 8908 is connected to an alert gate 8910 that, like the IM host complex gateway 895, is capable of performing the necessary protocol conversions to enable communication with the OSP host complex 880. The alert gate 8910 is the interface between the IM host complex 890 and the physical servers, such as servers in the OSP host complex 880, where state changes are occurring. In general, the information regarding state changes will be gathered and used by the IM host complex 890. However, the alert multiplexor 8908 also may communicate with the OSP host complex 880 through the IM gateway 895, for example, to provide the servers and subscribers of the OSP host complex 880 with certain information gathered from the alert gate 8910.

The alert gate 8910 can detect an alert feed corresponding to a particular type of alert. The alert gate 8910 may include a piece of code (alert receive code) capable of interacting with another piece of code (alert broadcast code) on the physical server where a state change occurs. In general, the alert receive code installed on the alert gate 8910 instructs the alert broadcast code installed on the physical server to send an alert feed to the alert gate 8910 upon the occurrence of a particular state change. Thereafter, upon detecting an alert feed, the alert gate 8910 contacts the alert multiplexor 8908, which in turn, informs the appropriate client system 805 of the detected alert feed.

In the implementation of FIG. 8, the IM host complex 890 also includes a subscriber profile server 8912 connected to a database 8914 for storing large amounts of subscriber profile data. The subscriber profile server 8912 may be used to enter, retrieve, edit, manipulate, or otherwise process subscriber profile data. In one implementation, a subscriber's profile data includes, for example, the subscriber's buddy list, alert preferences, designated stocks, identified interests, geographic location and other demographic data. The subscriber may enter, edit and/or delete profile data using an installed IM client application on the client system 805 to interact with the subscriber profile server 8912.

Because the subscriber's data is stored in the IM host complex 890, the subscriber does not have to reenter or update such information in the event that the subscriber accesses the IM host complex 890 using a new or different client system 805. Accordingly, when a subscriber accesses the IM host complex 890, the IM server 8902 can instruct the subscriber profile server 8912 to retrieve the subscriber's profile data from the database 8914 and to provide, for example, the subscriber's buddy list to the IM server 8902 and the subscriber's alert preferences to the alert multiplexor 8908. The subscriber profile server 8912 also may communicate with other servers in the OSP host complex 890 to share subscriber profile data with other services. Alternatively, user profile data may be saved locally on the client device 805.

Figure 9:
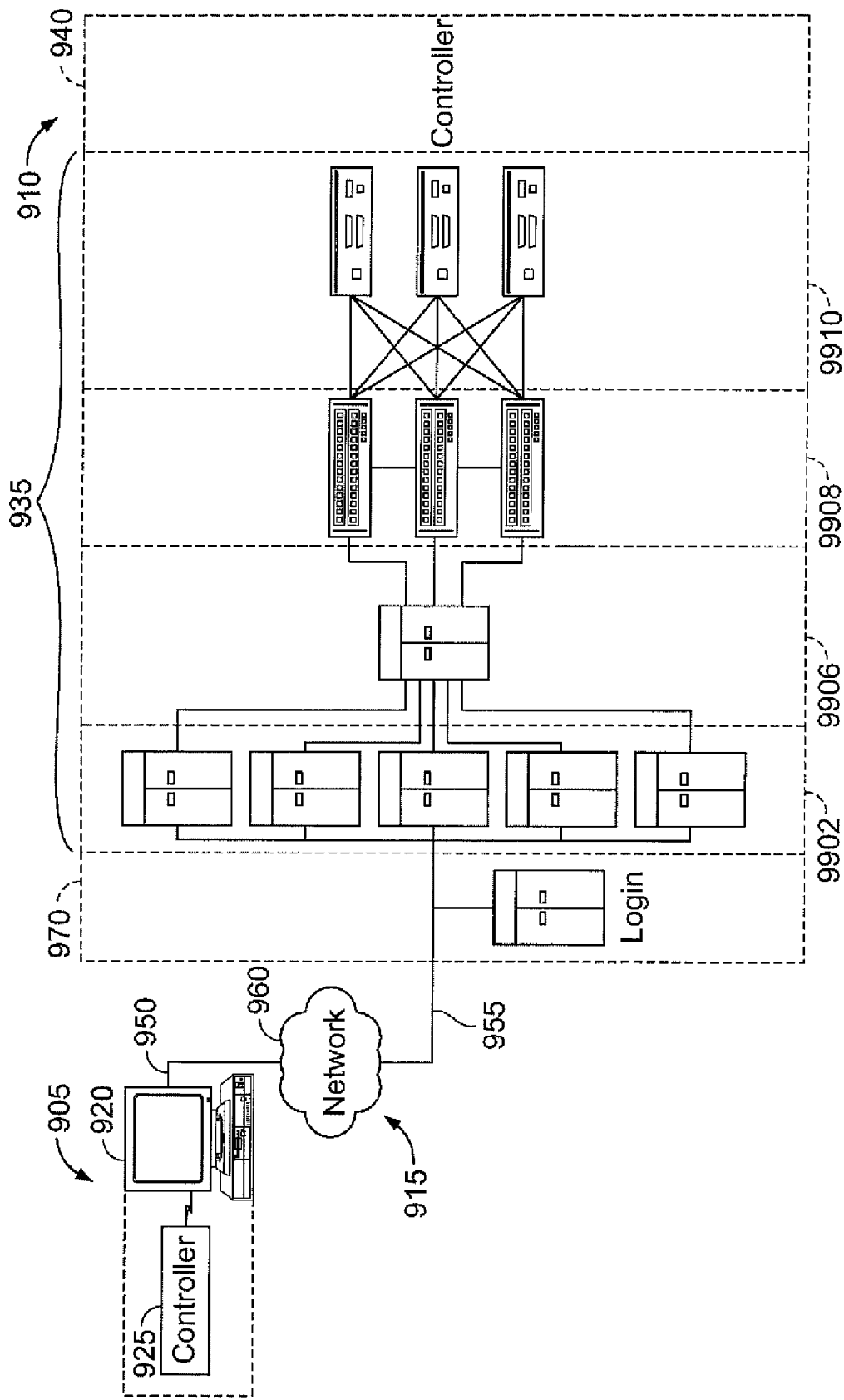

Referring to FIG. 9, a communications system 900 is capable of delivering and exchanging information between a client system 905 and a host system 910 through a communication link 915. Client system 905 typically includes one or more client devices 920 and one or more client controllers 925 for controlling the client devices 920. Host system 910 typically includes one or more host devices 935 and one or more host controllers 940 for controlling the host devices 935. The communications link 915 may include communication pathways 950, 955 enabling communications through the one or more delivery networks 960.

Examples of each element within the communication system of FIG. 9 are broadly described above with respect to FIGS. 4-8. In particular, the client system 905 and the communications link 915 typically have attributes comparable to those described with respect to client systems 405, 505, 605, 705 and 805 and communications links 415, 515, 615, 715 and 815 of FIGS. 4-8, respectively. Likewise, the host system 910 of FIG. 9 may have attributes comparable to and may illustrate one possible embodiment of the host systems 410, 510, 610, 710 and 810 shown in FIGS. 4-8, respectively. However, FIG. 9 describes several aspects of one implementation of the host system 910 in greater detail, focusing primarily on one particular implementation of the login server 970 and IN host complex 990.

The client system 905 includes a client device 920 and a client controller 925. The client controller 925 is generally capable of establishing a connection to the host system 910, including the IM host complex 990. In one implementation, the client controller 925 includes an IM application for communicating with servers in the IM host complex 990 utilizing exclusive IM protocols.

The host system 910 includes a host device 935 and a host controller 940. The host controller 940 is generally capable of transmitting instructions to any or all of the elements of the host device 935. For example, in one implementation, the host controller 940 includes one or more software applications loaded on one or more elements of the host device 935. However, in other implementations, as described above, the host controller 940 may include any of several other programs, machines, and devices operating independently or collectively to control the host is device 935.

The host system 910 includes a login server 970 capable of enabling communications between client systems 905 and various elements of the host system 910, including elements such as the IN host complex 990 and the OSP host complex 980; login server 970 is also capable of authorizing access by the client system 905 and those elements. The IM host complex 990 includes an IM server network 9902, a routing gateway 9906, an alert multiplexor network 9908, and one or more alert gates 9910. The IM server network 9902 may include an interconnected network of IN servers and the alert multiplexor network 9908 may include an interconnected network of alert multiplexors. In the implementation of FIG. 9, the IM server network 9902 and the alert multiplexor network 9908 are interconnected by a routing gateway 9906 that serves as a common hub to reduce the number of connections. Each IM server within IM server network 9902 can directly or indirectly communicate and exchange information with one or more of the alert multiplexors in the alert multiplexor network 9908. Each of the alert multiplexors in the alert multiplexor network 9908 may be connected to several alert gates 9910 that receive different types of alerts.

During a session, a subscriber typically will be assigned to one IM server in the IM server network 9902 and to one alert multiplexor in the alert multiplexor network 9908 based on one or more hashing techniques. In one implementation, for example, each IM server in the IM server network 9902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 9908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 990 while still enabling a subscriber to communicate, share information, or otherwise interact with other subscribers and servers in the IM host complex 990.

Figure 10:
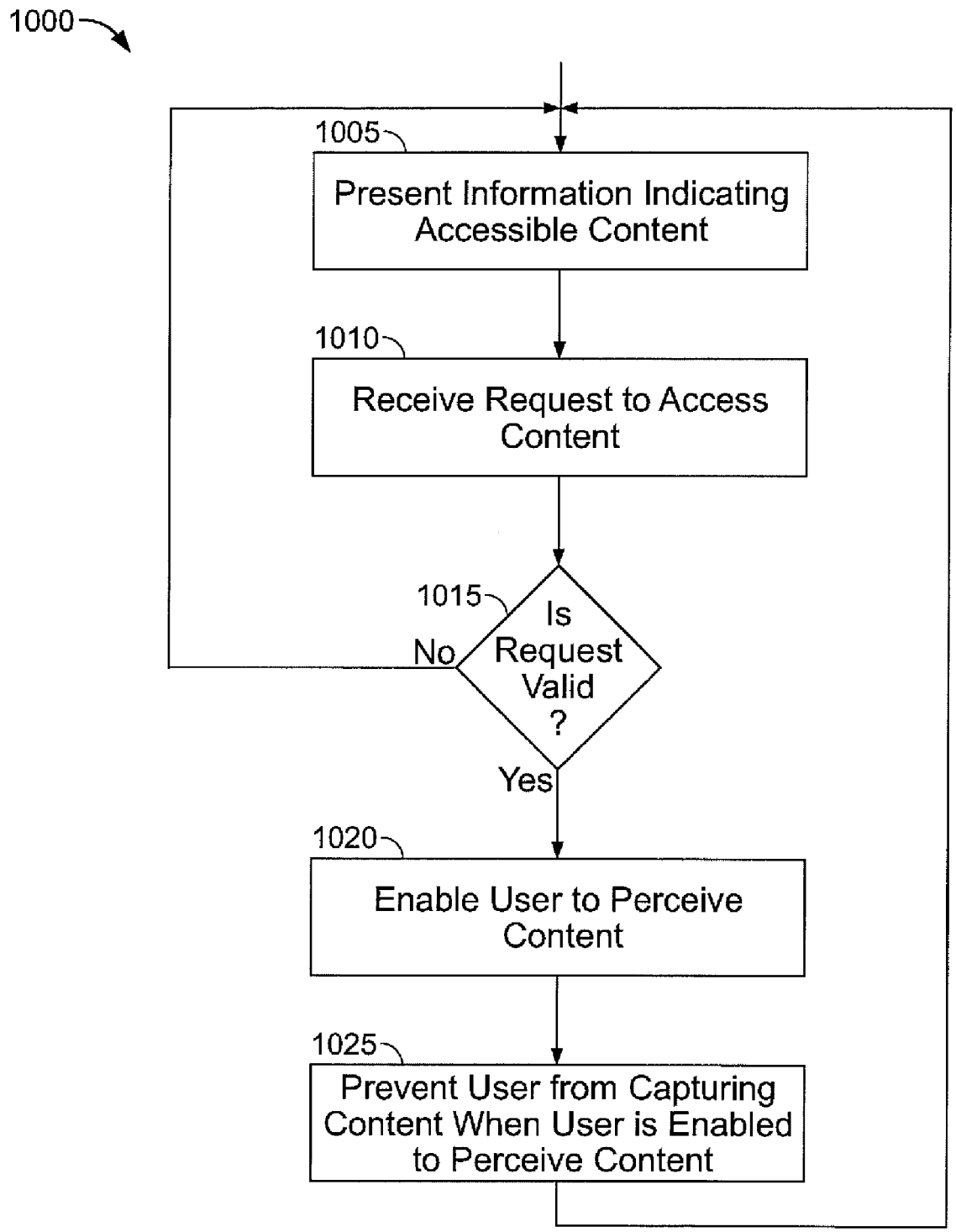
FIG. 10 is a flow chart of a communications method.

Referring also to FIG. 10, a host device (or a client device) interacts with one or more client devices according to procedure 1000 to prevent a user from capturing online content, such as, for example, an image, sensitive or classified text, audio, or video. The procedure 1000 may be implemented by any type of hardware, software, device, computer, computer system, equipment, component, program, application, code, storage medium, or propagated signal. In one implementation, procedure 1000 is performed by a Java applet, which is an application program that ruts inside a client device. When the user on a client device visits a webpage containing a Java applet, the Java applet is downloaded automatically from a host server to the client device, and the Java applet is then run automatically in the client's browser.

The procedure 1000 may be performed in any computer environment in which a user wishes to access electronic content. Thus, for example, the procedure 1000 may be implemented in a software package that a user accesses or operates from a home computer while offline. In this way, the producers of the software prevent certain content in the application program from being captured by the user.

The procedure 1000 may be implemented in any programming language, including, for example, machine language, assembly language, HTML, Fortran, C, BASIC, Visual Basic, or any other high-level language.

Examples of the elements that may perform procedure 1000 may be broadly described above with respect to FIGS. 4-9. In particular, the client devices typically have attributes comparable to those described with respect to client devices 420, 520, 620, 720, 820, and 920 and the host device typically has attributes comparable to those described with respect to host devices 435, 535, 635, 735, 835, and 935. The client devices and/or the host device may be directly or indirectly interconnected through any type of delivery network described herein. In this manner, the procedure 1000 of FIG. 10 may be performed by devices such as client devices 420, 520, 620, 720, 820, or 920 and host devices 435, 535, 635, 735, 835, or 935.

To prevent unauthorized access to content, access providers with electronic content and information to protect may set preferences regulating the ability of access seekers who perceive content (for example, a user who views an image or listens to audio) to capture the content (for example, an image may be saved or audio may be recorded). Typically, the access provider that wishes to protect content will be presented with a Graphical User Interface (GUI) and will use that GUI to select among various capture preferences including, for example, the conditions for making content available to access seekers and the directory where the available content is stored. An access provider's capture preferences may be maintained locally or on a host device.

In one implementation, the host device (it should be understood that the client device or any other type of medium may also or alternatively perform this procedure) presents information that indicates the location of content that is potentially accessible, though not presently perceivable (step 1005). The host device receives a request from an access seeker to access the content (step 1010). The host device determines whether the request from the user is valid (step 1015). If the request from the user is valid, the host device enables the user to perceive the content (step 1020). For example, if the content is an image, the host device enables the user to view the image. If the content is an audio signal, the host device enables the user to listen to the audio signal. While the user perceives the content, the host prevents the user from capturing the content (step 1025). For example, the host may prevent the user from saving and copying an image while that user is viewing the image. After the user finishes requesting the content, the host device removes the content so that the user may no longer perceive the content (step 1030) and presents information that indicates the potentially accessible content (step 1005).

FIGS. 11-16 are successive screenshots illustrating the process 1000 for allowing users to view online digital images while preventing the images from being captured by copying or saving.

Figure 11:
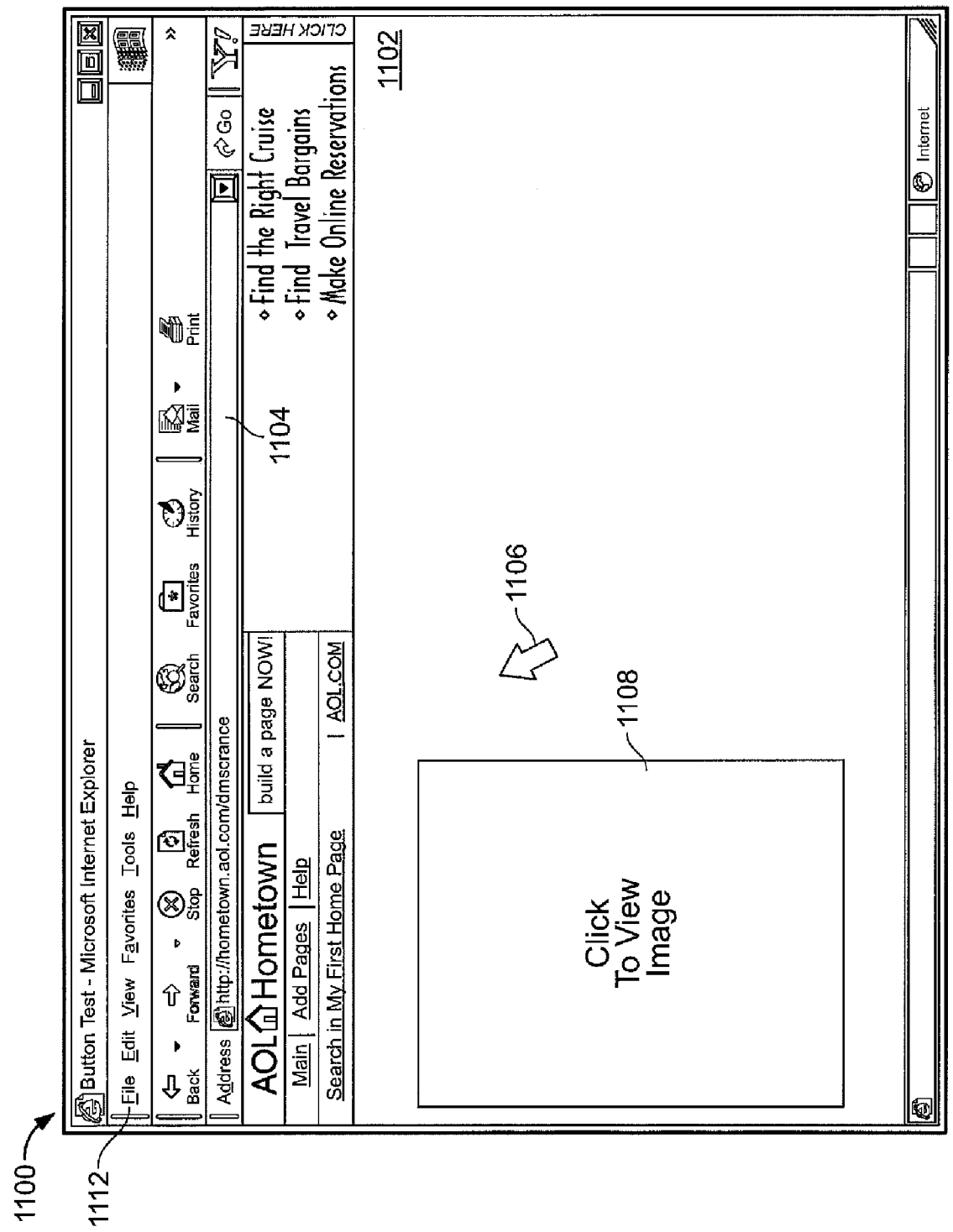
FIGS. 11-16 are screen shots illustrating a mechanism for preventing a digital image from being copied.

FIG. 11 shows an instance of a browser window 1100 displaying a webpage 1102 at a specified URL 1104 (for example, http://hometown.aol.com/dmscrance). Cursor 1106 in this screenshot is positioned within the browser window 1100. The webpage 1102 presents a display area 1108 that may include text providing the user with an option to view an underlying or associated image, for example, the text may instruct, "CLICK TO VIEW IMAGE."

Figure 12:
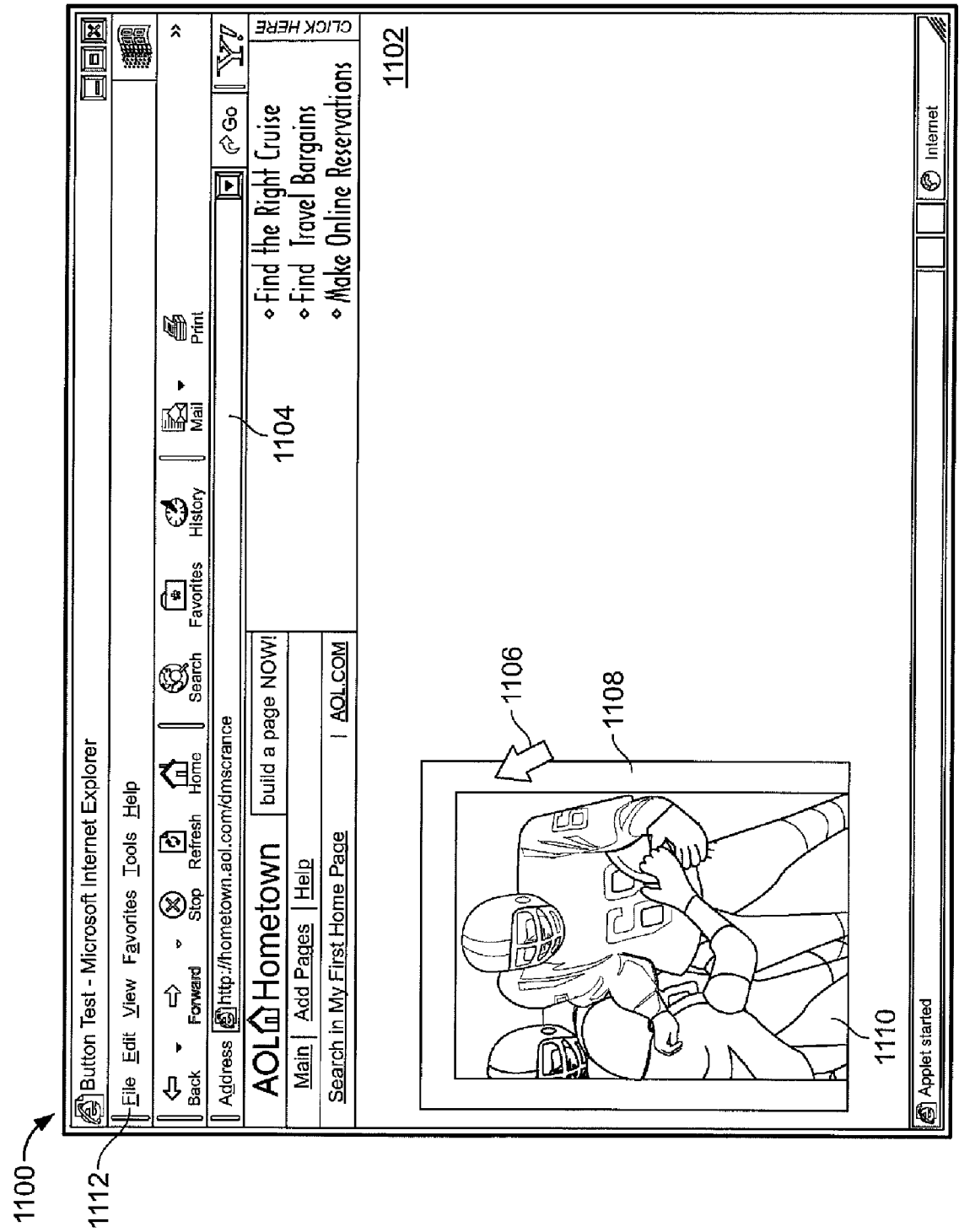

When the user positions the cursor 1106 on top of the display area 1108 and clicks the mouse button, an image 1110 is displayed as shown in FIG. 12. As soon as the user releases the mouse button, the image 1110 disappears and the screen resumes the appearance shown in FIG. 11.

Accordingly, the only way that the user can view the image 1110 is to click and hold the mouse button with the cursor 1106 on the display area 1108. While the mouse button is pressed, the image 1110 is displayed but other browser functions are unavailable. For instance, while pressing the mouse button, a user is unable to print or save the webpage 1102 by accessing the File menu 1112. Accordingly, the user is unable to use the File save or print features of the browser to capture the image 1110 because the only time that the File save operation is available to the user is when the mouse button is released and the image has disappeared.

Figure 13:
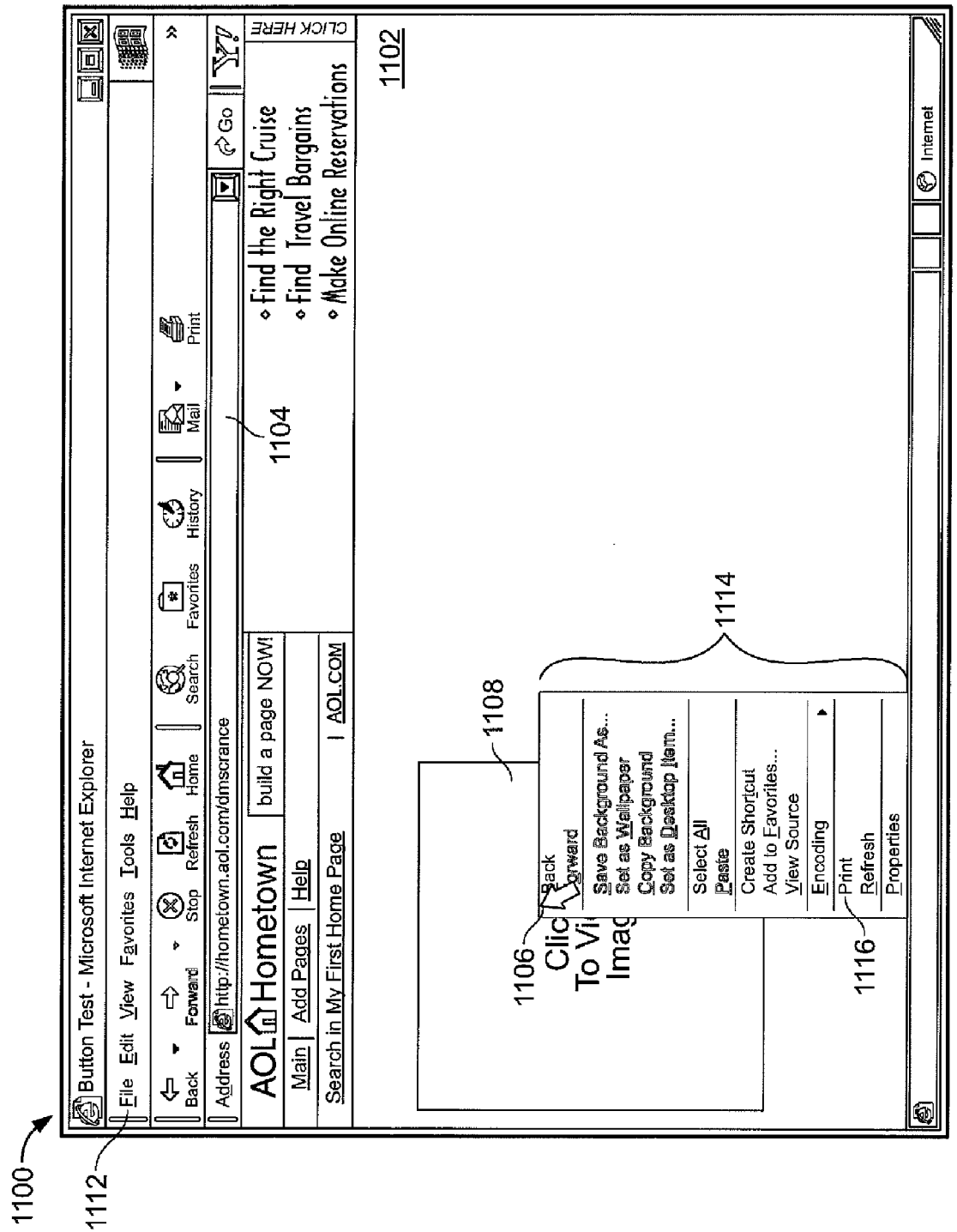

Moreover, as shown in FIG. 13, the user is unable to use the browser's right-click feature to save or print a copy of the image. Ordinarily, in many browser applications, clicking the mouse's right button while the cursor 1106 is positioned over an image 1110 brings up a menu, such as menu 1114 in FIG. 13, that provides the user with several options including printing and/or saving the image. However, the right-click menu 1114 is not available when the user already is holding down the mouse's left button, which as noted above, is the only time that the image 1110 is displayed. Accordingly, the user cannot use the right-click menu to print or save the image 1110. If the user right-clicks the mouse button while the cursor 1106 is positioned over the display area 1108 (that is, where the image would appear if the left mouse button was depressed while atop the display area 1108), the resulting menu 1114 provides no option for saving an image because the cursor 1106 is not atop a presently displayed image. Moreover, if the user selects the Print option 1116 from the menu 1114, the resulting hard copy print will appear similar to what is shown in FIG. 13—that is, the print out will not include the image 1110 shown in FIG. 12.

Details for implementing the mechanisms and techniques discussed above follow. In particular, a source code listing is set forth below for a Java applet that was used to generate the screenshots of FIGS. 11-13.

A first design parameter for the implementation is that the single image/applet should be made secure for multiple clients and/or servers.

A second design parameter for the implementation is that the actual applet that is displaying the image preferably would be displayed in a frame. The text in the frame may, for example, be "CLICK". The image is displayed only when the users clicks and holds the mouse button. When the mouse button is released, the image is no longer displayed. Regarding this second design parameter, owners of images are often concerned with the security of their image files, as well as with the ability of others to print the images. By requiring users to hold down their mouse buttons to view images, the users' ability to do a File—Print is effectively disabled.

The source code for the Java applet is as follows:

```
import java.awt.*;
import java.applet.Applet;
import java.awt.event.*;
        class ImageCanvas extends Canvas {
            Image image;
            Dimension preferredSize;
            int w,h;
                ImageCanvas(Image img) {
                    image = img;
                    while ((w =
                    image.getWidth(this)) == -1){ }
                    while ((h =
                    image.getHeight(this)) == -1) { }
                    preferredSize = new Dimension(w,h);
                }
                public Dimension getMinimumSize( ) {
                    return preferredSize;
                }
                public Dimension getPreferredSize( ) {
                    return preferredSize;
                }
                public void paint(Graphics g) {
                    g.drawImage(image, 0, 0, this);
                }
        }
```

The source code for the Java applet is as follows:

```
public class ImageApplet extends Applet
    {
    Button button1 = new Button("PRESS AND HOLD BUTTON TO
    VIEW IMAGE");
    Panel mainPanel = new Panel( );
    Panel buttonPanel = new Panel( );
    CardLayout cardLO = new CardLayout( );
    ImageCanvas ic2;
    Label label = new Label("default label");
    public void init( ) {
        setLayout(new BorderLayout( ));
        button1.addMouseListener(new ButtonHandler( ));
        buttonPanel.add(button1);
        add("North", buttonPanel);
        mainPanel.setLayout(cardLO);
        Panel ic2Panel = new Panel( );
        Panel blankPanel = new Panel( );
        Image image2 = getImage(getCodeBase( ),
        "a_emmitt.jpg");
        ImageCanvas ic2 = new ImageCanvas(image2);
        ic2Panel.add(ic2);
        mainPanel.add("ic2", ic2Panel);
        mainPanel.add("blank", blankPanel);
        add("Center", mainPanel);
        cardLO.show(mainPanel, "blank");
    }
    class ButtonHandler extends MouseAdapter {
        public void mousePressed(MouseEvent e) {
            cardLO.show(mainPanel, "ic2");
        }
        public void mouseReleased(MouseEvent e) {
            cardLO.show(mainPanel, "blank");
        }
    }
}
```

It should be understood that the above detailed description and specific examples are given by way of illustration only, since various changes and modifications will become apparent to those skilled in the art from this detailed description.

For brevity, several elements in the figures described above are represented as monolithic entities. As would be understood by one skilled in the art, however, these elements each may include numerous interconnected computers and components designed to perform a set of specified operations and/or dedicated to a particular geographical region.

The techniques, methods, and systems described here may find applicability in any computing or processing environment in which digital images can be viewed, generated, copied or otherwise manipulated. Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

A number of embodiments have been described. Nevertheless, it will be understood that advantageous results still could be achieved if steps of the disclosed techniques were performed in a different order and/or if components in the disclosed systems were combined in a different manner and/or replaced or supplemented by other components. Accordingly, other embodiments are within the scope of the following claims.

Figure 14:
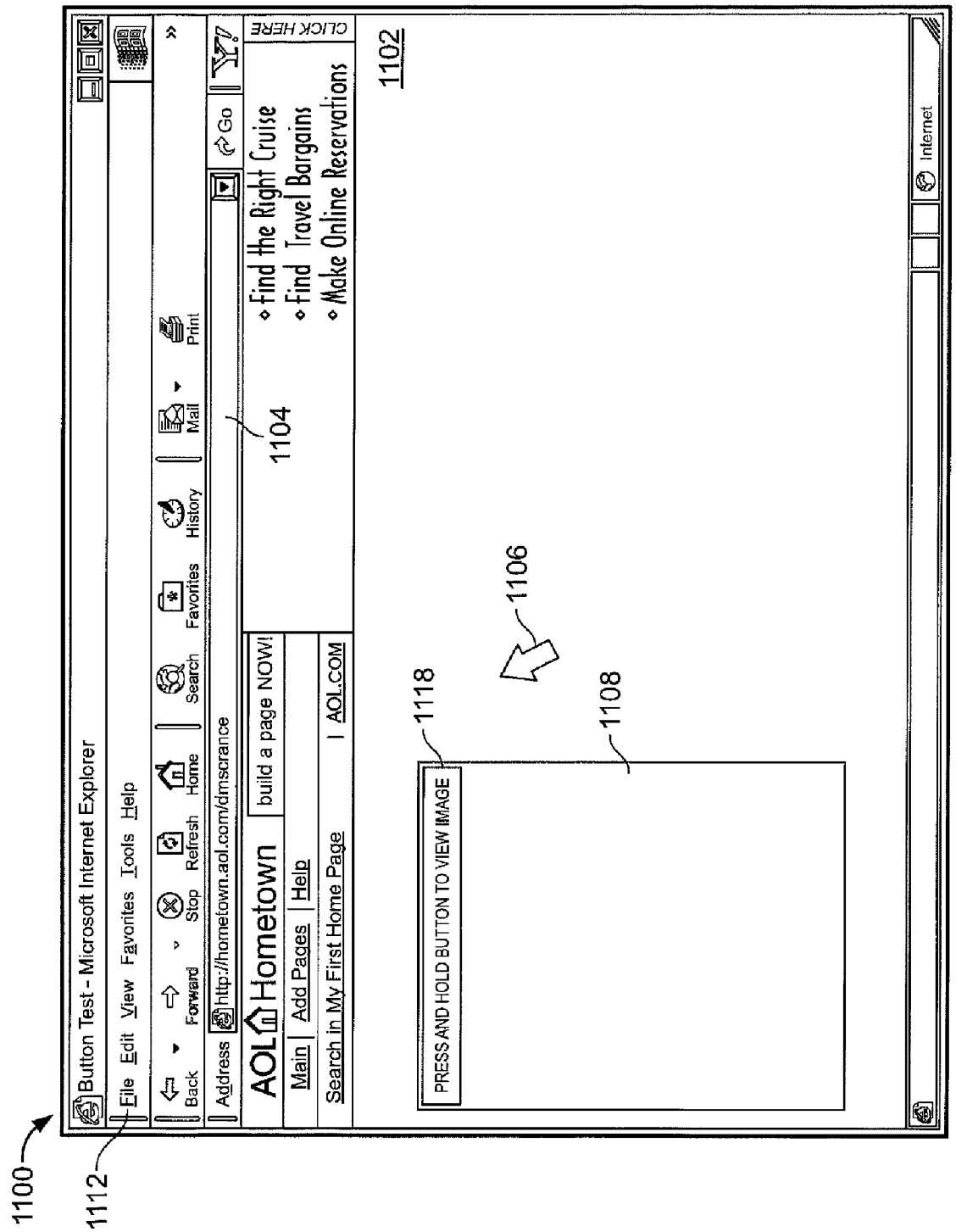
Figure 15:
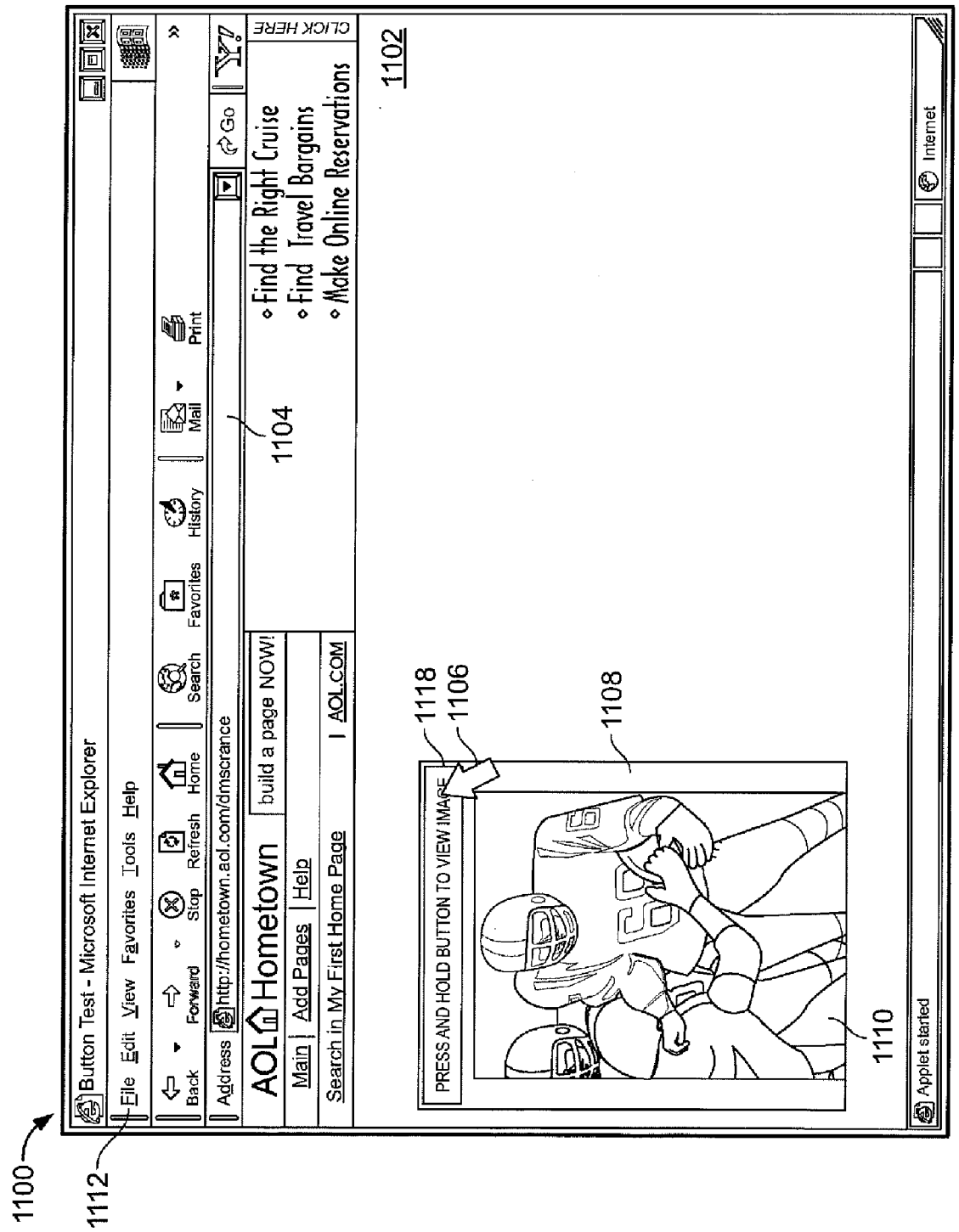
Figure 16:
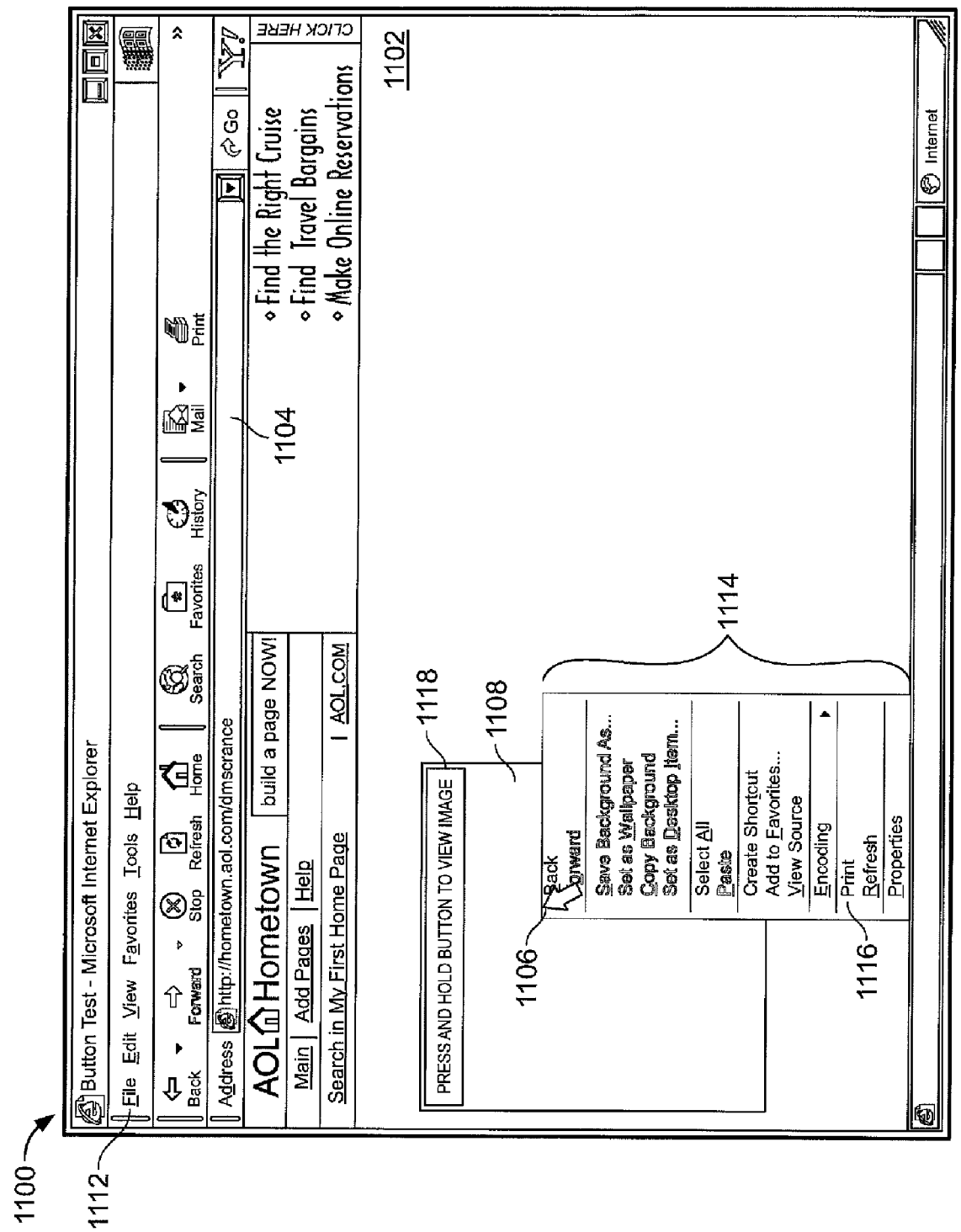

For example, as shown in the successive screenshots of FIGS. 14-16, the output of the Java applet may include a button 1118 labeled "PRESS AND HOLD BUTTON TO VIEW IMAGE." When the user positions the cursor 1106 on top of the button 1118 and clicks the mouse button, the image 1110 is displayed as shown in FIG. 15. As soon as the user releases the mouse button, the image 1110 disappears and the screen would appear as in FIG. 14.

Accordingly, the user views the image 1110 by clicking and holding the cursor 1106 on the button 1118. Moreover, as shown in FIG. 16, the user is unable to use the browser's right-click feature to save or print a copy of the image. If the user right-clicks the mouse button while the cursor 1106 is positioned over the display area 1108 (that is, where the image would appear if the left mouse button was depressed while atop the button 1118), the resulting menu 1114 provides no option for saving an image because the cursor 1106 is not atop a presently displayed image.

What is claimed is:

1. A computer-implemented method of protecting content, the method comprising:
   presenting, within a window of an interface configured to display browser-navigated content, a display area including a visual indicator that indicates the existence of un-presented underlying content and presenting an indicator of an option to perceive currently un-presented underlying content;
   detecting a mouse button click command while a mouse pointer is positioned within the display area;
   in response to the received mouse button command and while the mouse button command is being received, presenting the underlying content and preventing capture of the underlying content.

2. The method of claim 1, wherein the underlying content includes an image.

3. The method of claim 1, wherein the display area includes a single indicator having both the visual indicator and the indicator of the option to perceive currently un-presented underlying content.

4. The method of claim 1, wherein presenting the underlying content includes presenting the underlying content within the display area.

5. The method of claim 1, further comprising preventing saving of the underlying content to a local drive.

6. The method of claim 1, further comprising preventing printing of the underlying content.

7. The method of claim 1, wherein the received mouse button click command is a request to perceive the underlying content command, and further comprising after the request to perceive command is released, preventing the presentation of the underlying content and reestablishing access to functions enabling capture of content other than the underlying content.

8. The method of claim 1, wherein presenting the display area including the visual indicator includes preventing access to the un-presented underlying content.

9. A system for protecting content, the system comprising:
   a processor having communications links for receiving content from a network;
   an output device for making received network content perceivable;
   an input device for receiving user input; and
   memory storing software instructions performed by the processor (i) for presenting, within a window of an interface configured to display browser-navigated content, a display area including a visual indicator that indicates the existence of un-presented underlying content and for presenting an indicator of an option to perceive currently un-presented underlying content; (ii) for detecting a mouse button click command while a mouse pointer is positioned within the display area; and (iii) for, in response to the received mouse button command and while the mouse button command is being received, presenting the underlying content and preventing capture of the underlying content.

10. The system of claim 9, wherein the underlying content includes an image.

11. The system of claim 10, wherein the display area includes a single indicator having both the visual indicator and the indicator of the option to perceive currently un-presented underlying content.

12. The system of claim 9, wherein the software instructions for presenting the underlying content includes software instructions for presenting the underlying content within the display area.

13. The system of claim 9, further comprising software instructions for preventing saving of the underlying content to a local drive.

14. The system of claim 9, further comprising software instructions for preventing printing of the underlying content.

15. The system of claim 9, wherein the received mouse button click command is a request to perceive the underlying content command, and the memory stores software instructions for, after the request to perceive command is released, preventing the presentation of the underlying content and reestablishing access to functions enabling capture of content other than the underlying content.

16. The system of claim 9, wherein the software instructions for presenting the display area including the visual indicator includes software instructions for preventing access to the un-presented underlying content.

17. A system for protecting content, the system comprising:
   a means for presenting, within a window of an interface configured to display browser-navigated content, a display area including a visual indicator that indicates the existence of un-presented underlying content and for presenting an indicator of an option to perceive currently un-presented underlying content;

a means for detecting a mouse button click command while a mouse pointer is positioned within the display area; and a means for presenting the underlying content and preventing capture of the underlying content in response to the received mouse button command and while the mouse button command is being received.

18. The system of claim 17, wherein the received mouse button click command is a request to perceive the underlying content command, and further comprising a means for preventing the presentation of the underlying content and reestablishing access to functions enabling capture of content other than the underlying content after the request to perceive command is released.

19. The system of claim 17, wherein the means for presenting the display area including the visual indicator includes a means for preventing access to the un-presented underlying content.

20. The system of claim 17, wherein the display area includes a single indicator having both the visual indicator and the indicator of the option to perceive currently un-presented underlying content.

* * * * *